(12) United States Patent
Gurvich et al.

(10) Patent No.: US 11,014,331 B2
(45) Date of Patent: May 25, 2021

(54) STRUCTURED PANEL WITH NON-PARALLEL CAVITY WALLS

(71) Applicant: Rohr, Inc., Chula Vista, CA (US)

(72) Inventors: Mark R. Gurvich, Middletown, CT (US); Georgios S. Zafiris, Glastonbury, CT (US); Jeffrey A. Anderson, San Diego, CA (US); Bryce T. Kelford, San Diego, CA (US); Steven M. Kestler, San Diego, CA (US); George Hoehn, Oceanside, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 16/531,753

(22) Filed: Aug. 5, 2019

(65) Prior Publication Data

US 2021/0039349 A1    Feb. 11, 2021

(51) Int. Cl.
*B32B 3/28* (2006.01)
*E04C 2/36* (2006.01)
*B29D 99/00* (2010.01)
*G10K 11/168* (2006.01)
*B64C 3/18* (2006.01)
*B64C 1/06* (2006.01)

(52) U.S. Cl.
CPC ............ *B32B 3/28* (2013.01); *B29D 99/0021* (2013.01); *E04C 2/36* (2013.01); *B64C 1/06* (2013.01); *B64C 1/064* (2013.01); *B64C 3/182* (2013.01); *G10K 11/168* (2013.01); *Y10T 428/24694* (2015.01)

(58) Field of Classification Search
CPC .... B32B 3/12; B32B 3/20; B32B 3/26; B32B 3/28; B32B 2607/00; B32B 2419/00; Y10T 428/24694; B64C 3/18; B64C 3/182; B64C 1/06; B64C 1/064
See application file for complete search history.

(56) References Cited

U.S. PATENT DOCUMENTS 3,011,602 A * 12/1961 Ensrud .................. E04C 2/32
                                              428/180
3,734,234 A    5/1973 Wirt
4,034,135 A * 7/1977 Passmore ............... B32B 3/28
                                              428/184

(Continued)

OTHER PUBLICATIONS

EP search report for EP19212449.3 dated Jul. 2, 2020.

*Primary Examiner* — Donald J Loney
(74) *Attorney, Agent, or Firm* — Getz Balich LLC

(57) ABSTRACT

A panel includes a corrugated base with base corrugations configured from first base segments and second base segments. A first of the base corrugations includes a first of the first base segments and a first of the second base segments that is non-parallel to the first of the first base segments. The first of the base corrugations forms a first channel that extends laterally between and longitudinally along the first of the first base segments and the first of the second base segments. A corrugated stringer includes a plurality of stringer corrugations arranged longitudinally along and within the first channel. The stringer corrugations are configured from first stringer segments and second stringer segments. A first of the stringer corrugations includes a first of the first stringer segments and a first of the second stringer segments that is non-parallel to the first of the first stringer segments.

20 Claims, 22 Drawing Sheets

(56) References Cited

U.S. PATENT DOCUMENTS

| | | | |
|---|---|---|---|
| 4,292,375 A * | 9/1981 | Ko | B21D 26/055 |
| | | | 428/593 |
| 5,543,204 A | 8/1996 | Ray | |
| 6,274,216 B1 | 8/2001 | Gonidec et al. | |
| 7,051,489 B1 | 5/2006 | Swiszcz | |
| 9,403,340 B2 | 8/2016 | Zafiris et al. | |
| 9,978,354 B2 | 5/2018 | Nampy | |
| 10,309,305 B2 | 6/2019 | Biset et al. | |
| 10,316,755 B2 | 6/2019 | Biset et al. | |
| 2014/0034416 A1 | 2/2014 | Liu | |
| 2017/0301334 A1* | 10/2017 | Nampy | G10K 11/172 |
| 2019/0054999 A1 | 2/2019 | Narayanan Nampy | |

\* cited by examiner $R_1 \neq R_2$ or $R_1 = R_2$

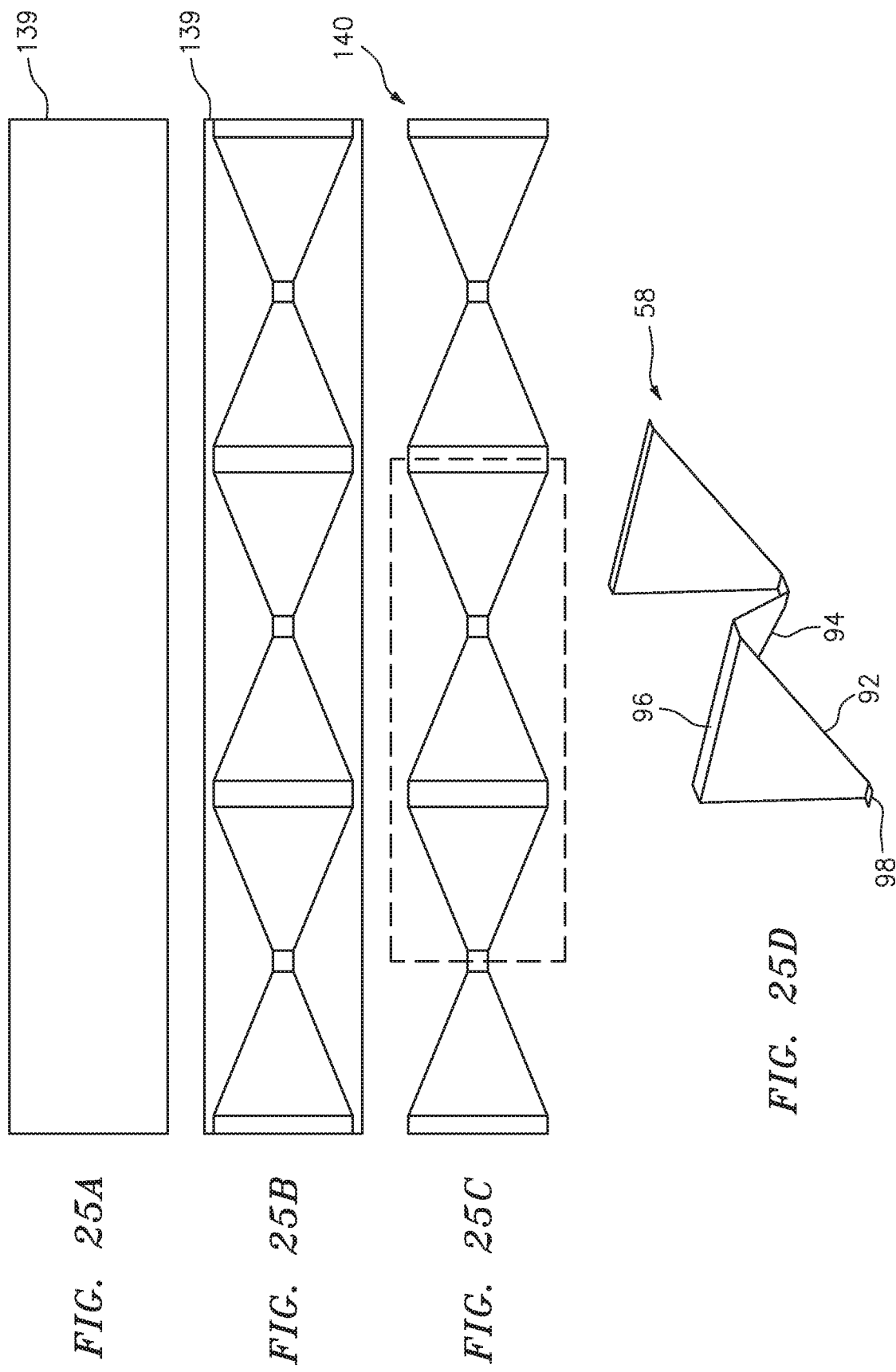

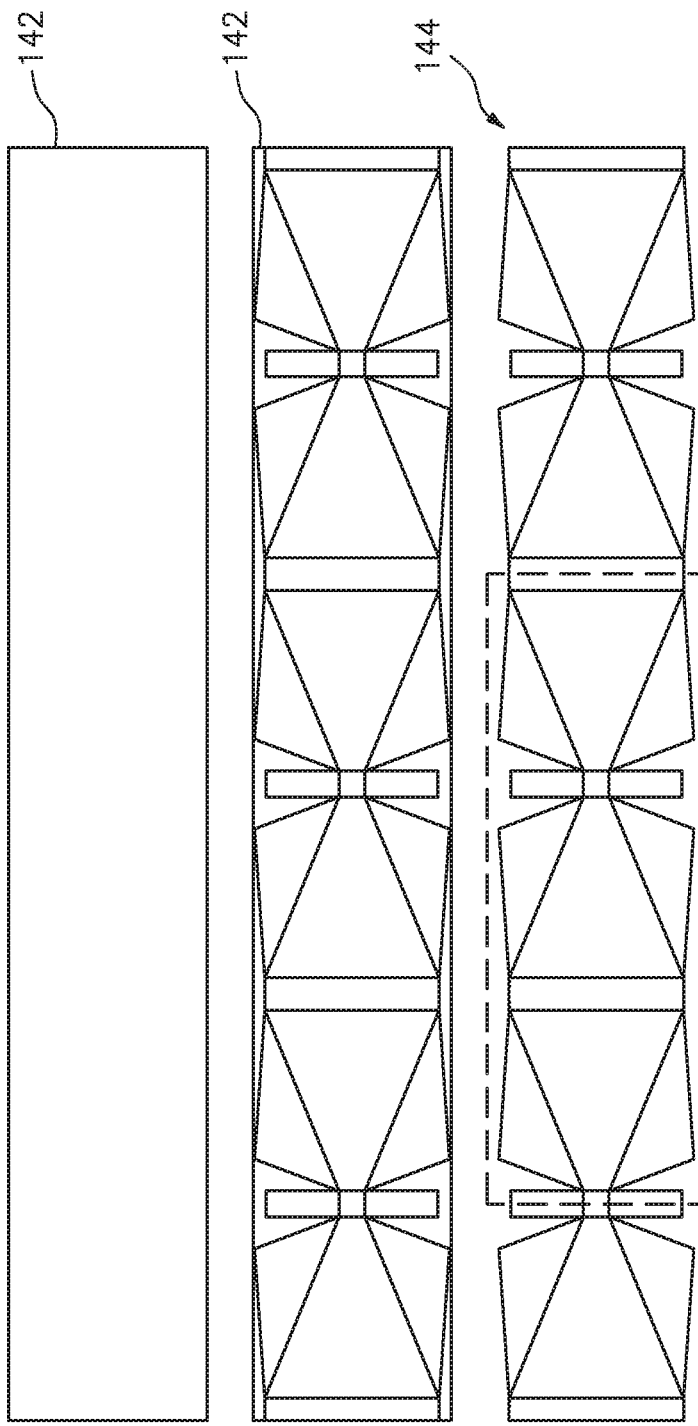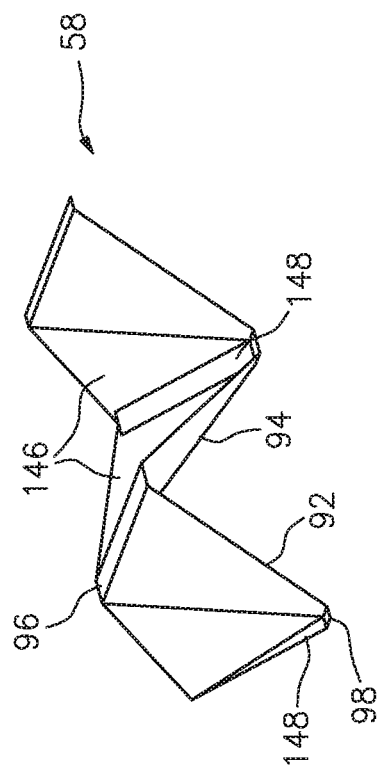

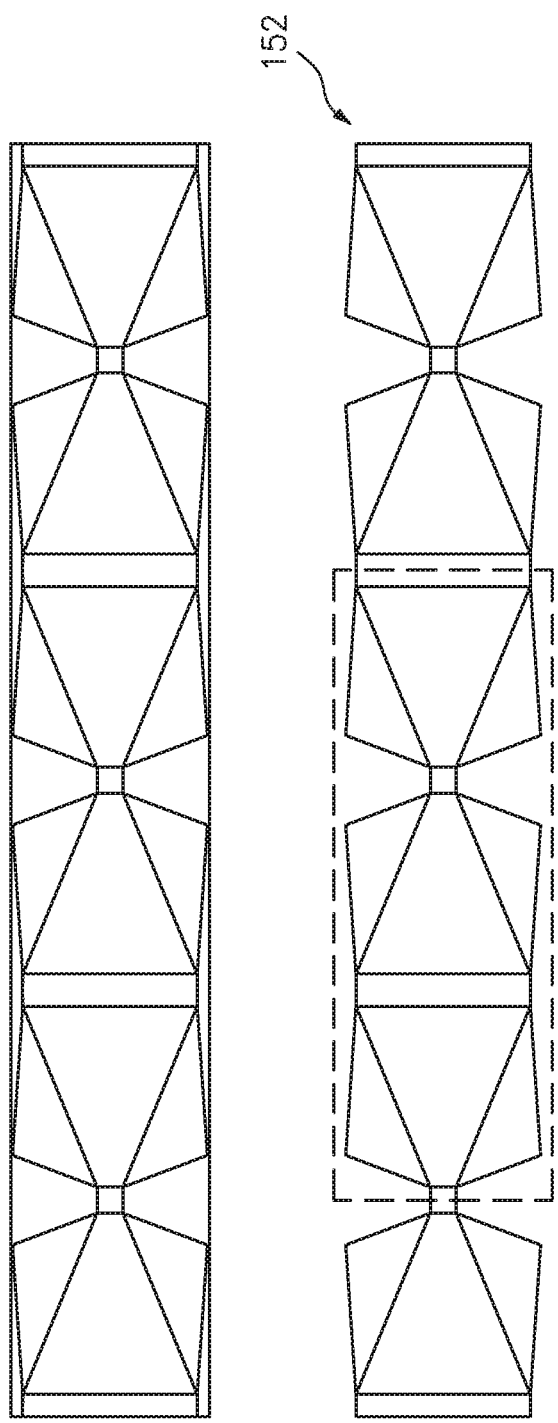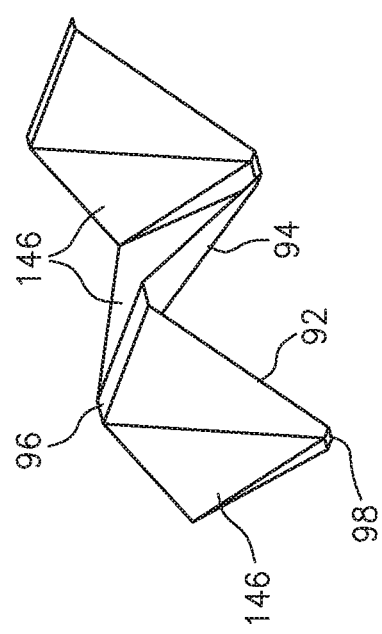
FIG. 28A  FIG. 28B  FIG. 28C

STRUCTURED PANEL WITH NON-PARALLEL CAVITY WALLS

BACKGROUND

1. Technical Field

This disclosure relates generally to a structure panel and, more particularly, to a panel with a cellular core.

2. Background Information

Various structured panels are known in the art. Some of these structured panels may be configured for attenuating noise generated by, for example, an aircraft propulsion system. While these known structured panels have various advantages, there is still room in the art. There is a need in the art therefore for an improved structured panel with, for example, increased rigidity and/or buckling resistance and/or strength.

SUMMARY OF THE DISCLOSURE

According to an aspect of the present disclosure, a panel is provided that includes a core. The core includes a corrugated base and a corrugated stringer. The corrugated base includes a plurality of base corrugations configured from at least a plurality of first base segments and a plurality of second base segments. A first of the plurality of base corrugations includes a first of the plurality of first base segments and a first of the plurality of second base segments that is non-parallel to the first of the plurality of first base segments. The first of the plurality of base corrugations forms a first channel that extends laterally between and longitudinally along the first of the plurality of first base segments and the first of the plurality of second base segments. The corrugated stringer includes a plurality of stringer corrugations arranged longitudinally along and within the first channel. The plurality of stringer corrugations are configured from at least a plurality of first stringer segments and a plurality of second stringer segments. A first of the plurality of stringer corrugations includes a first of the plurality of first stringer segments and a first of the plurality of second stringer segments that is non-parallel to the first of the plurality of first stringer segments.

According to another aspect of the present disclosure, a panel is provided that includes a first skin, a second skin and a core arranged between and connected to the first skin and the second skin. The core includes a corrugated base and a plurality of corrugated stringers. The corrugated base is configured with a plurality of base corrugations, a plurality of first channels and a plurality of second channels. Each of the plurality of base corrugations forms a respective one of the first channels adjacent the first skin. Each adjacent pair of the plurality of base corrugations form a respective one of the second channels laterally therebetween and adjacent the second skin. Each of the plurality of corrugated stringers is configured with a plurality of stringer corrugations arranged within a respective one of the first channels and connected to the corrugated base and the first skin.

According to still another aspect of the present disclosure, a method is provided for forming a panel. During this method, a corrugated base is formed. This corrugated base is configured with a plurality of base corrugations, a plurality of first channels and a plurality of second channels. Each of the plurality of base corrugations forms a respective one of the first channels. Each adjacent pair of the plurality of base corrugations forms a respective one of the second channels laterally therebetween. A corrugated stringer is formed. This corrugated stringer is configured with a plurality of stringer corrugations. The corrugated stringer are arranged with the corrugated base such that the plurality of stringer corrugations are located longitudinally along and within a first of the plurality of first channels. The corrugated stringer is connected to a first of the plurality of base corrugations.

The corrugated stringer may be connected to the first of the plurality of base corrugations by one or more tabs.

The first of the plurality of first base segments may be angularly offset from the first of the plurality of second base segments by a base segment angle. The base segment angle may be an acute angle, a ninety-degree angle or an obtuse angle. In addition or alternatively, a first of the plurality of first stringer segments may be angularly offset from the first of the plurality of second stringer segments by a stringer segment angle. The stringer segment angle may be an acute angle, a ninety-degree angle or an obtuse angle.

The core may be configured with a cavity. The cavity may extend laterally between the first of the plurality of first base segments and the first of the plurality of second base segments. The cavity may extend longitudinally between the first of the plurality of first stringer segments and the first of the plurality of second stringer segments.

Each of the plurality of stringer corrugations may extend laterally between and/or may be connected to the first of the plurality of first base segments and/or the first of the plurality of second base segments.

The panel may include a first skin. The core may be arranged adjacent and connected to the first skin.

The panel may include a first skin and a second skin. The core may be arranged between and/or may be connected to the first skin and the second skin.

The first skin may be a porous first skin.

The second skin may be a non-porous second skin.

Each of the plurality of base corrugations may be connected to the first skin and the second skin. In addition or alternatively, each of the plurality of stringer corrugations may be connected to at least the first skin or the second skin.

The first of the plurality of first base segments may be configured as a first baffle. The first of the plurality of second base segments may be configured as a second baffle.

The first of the plurality of first base segments may be configured as a baffle. The first of the plurality of second base segments may be configured as a porous septum.

The first of the plurality of first base segments may be configured as a first porous septum. The first of the plurality of second base segments may be configured as a second porous septum.

The first of the plurality of first stringer segments may be configured as a first baffle. The first of the plurality of second stringer segments may be configured as a second baffle.

The first of the plurality of first stringer segments may be configured as a baffle. The first of the plurality of second stringer segments may be configured as a porous septum.

The first of the plurality of first stringer segments may be configured as a first porous septum. The first of the plurality of second stringer segments may be configured as a second porous septum.

The first of the plurality of first base segments may be configured with a structural reinforcement. In addition or alternatively, the first of the plurality of second base segments may be configured with a structural reinforcement.

The first of the plurality of first stringer segments may be configured with a structural reinforcement. In addition or alternatively, the first of the plurality of second stringer segments may be configured with a structural reinforcement.

A second of the plurality of base corrugations may include a second of the plurality of first base segments and a second of the plurality of second base segments that is non-parallel to the second of the plurality of first base segments. The second of the plurality of base corrugations may form a second channel that extends laterally between and longitudinally along the second of the plurality of first base segments and the second of the plurality of second base segments. The core may also include a second corrugated stringer. The second corrugated stringer may include a plurality of second stringer corrugations arranged longitudinally along and within the second channel.

A second of the plurality of base corrugations may include a second of the plurality of first base segments and a second of the plurality of second base segments that is non-parallel to the second of the plurality of first base segments. A second channel may extend laterally between and longitudinally along the first of the plurality of second base segments and the second of the plurality of first base segments. The core may also include a second corrugated stringer. The second corrugated stringer may include a plurality of second stringer corrugations arranged longitudinally along and within the second channel.

The foregoing features and the operation of the invention will become more apparent in light of the following description and the accompanying drawings.

BRIEF DESCRIPTION OF THE DRAWINGS

FIGS. 25A-25D illustrate a sequence of steps for forming a corrugated stringer.

FIGS. 26A-26D illustrate a sequence of steps for forming an alternative corrugated stringer.

FIGS. 28A-28C illustrate a sequence of steps for forming an alternative corrugated stringer.

DETAILED DESCRIPTION

The present disclosure includes structured panels and method for forming structured panels such as, but not limited to, acoustic panels for attenuating sound; e.g., noise. An exemplary acoustic panel may be configured to attenuate noise generated by an aircraft propulsion system such as, but not limited to, a turbofan propulsion system, a turbojet propulsion system, a turboprop propulsion system, a turboshaft propulsion system and a propfan propulsion system. With such a configuration, the acoustic panel may be configured with a nacelle of the propulsion system. The acoustic panel, for example, may be configured as or with an inner or outer barrel, a translating sleeve of a thrust reverser, a blocker door, etc. Alternatively, the acoustic panel may be configured with another component/structure of the aircraft such as its fuselage or a wing. Furthermore, the acoustic panel may be configured to also or alternatively attenuate aircraft related noise other than sound generated by the propulsion system. The structured panels of the present disclosure, however, may alternatively be configured for non-aircraft applications. In addition, the structured panels of the present disclosure may be configured for applications other than noise attenuation applications.

Figure 1A:
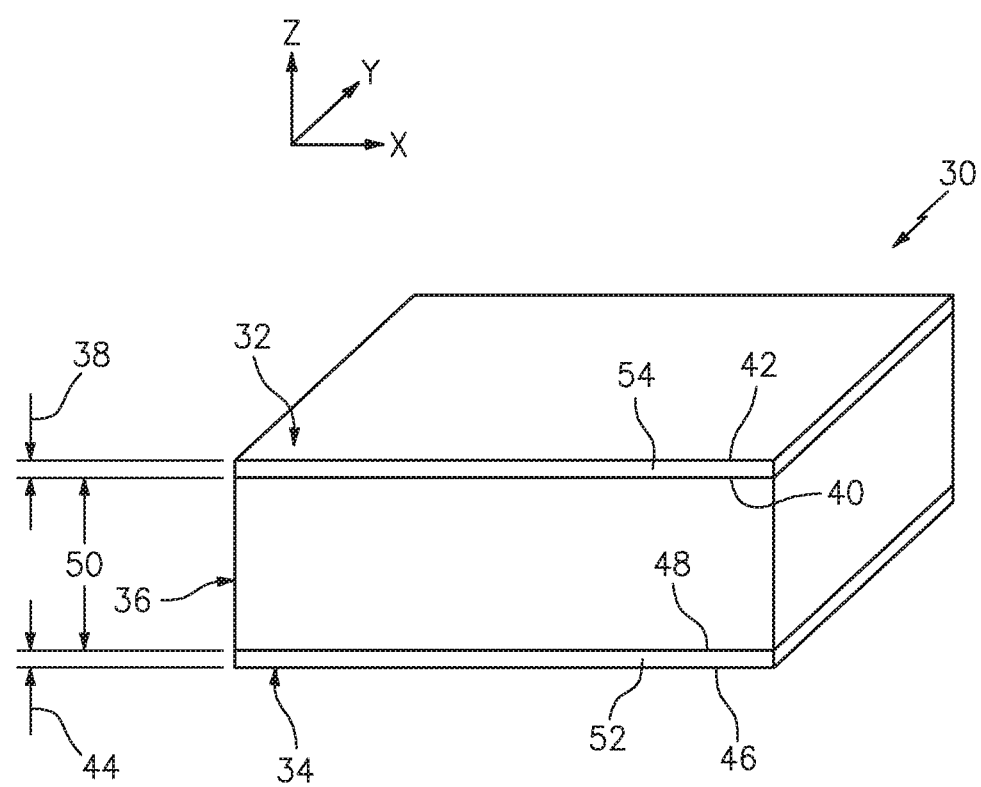
FIGS. 1A-1C are partial, perspective block diagram illustrations of various structured panels.
Figure 1B:
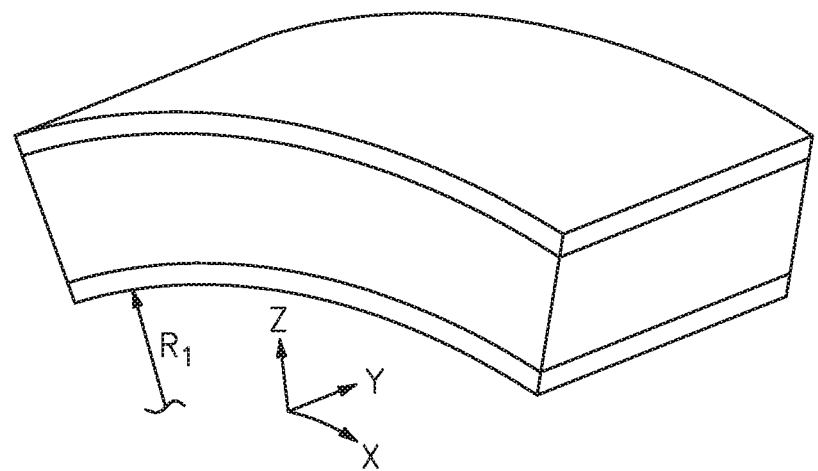
Figure 1C:
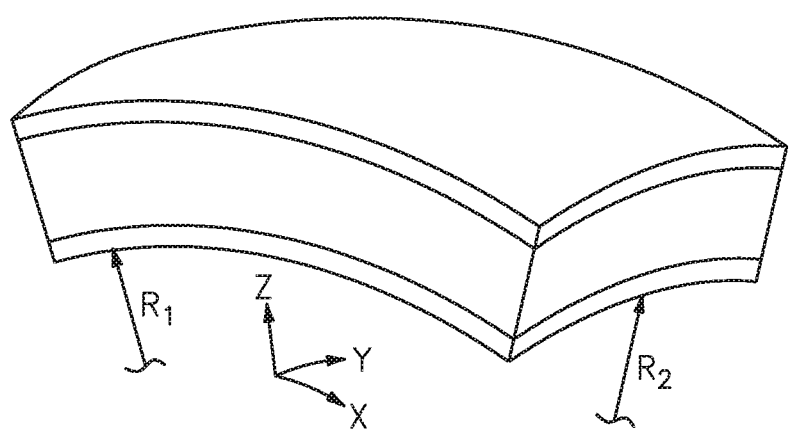

FIG. 1A is a partial, perspective block diagram illustration of an exemplary one of the structured panels 30 of the present disclosure. This structured panel 30 extends longitudinally along a Y-axis. The structured panel 30 extends laterally along an X-axis. The structured panel 30 extends vertically along a Z-axis. The term "vertical" is used herein to describe a depthwise panel direction and is not limited to a gravitational up/down direction; however, for ease of description, certain elements of the structured panel 30 may be designated as "top" or "bottom" based on its relative position in the drawing. Furthermore, for ease of illustration, the X-Y plane is shown as a generally flat plane. However, in other embodiments, the X-Y plane and, thus, the structured panel 30 may be curved in one or two directions and/or follow an undulating geometry; e.g., see FIGS. 1B and 1C. For example, the X-Y plane and, thus, the structured panel 30 may be arcuate, cylindrical or conical with or without radial undulations. Thus, the vertical direction may change at different locations along the X-Y plane; e.g., the vertical direction may be a radial direction for a cylindrical, conical or spherical structured panel.

The structured panel 30 of FIG. 1A includes a top (e.g., face) skin 32, a bottom (e.g., back) skin 34 and a cellular core 36. The cellular core 36 is disposed and extends vertically between the top skin 32 and the bottom skin 34. The cellular core 36 is also connected to the top skin 32 and the bottom skin 34. The cellular core 36, for example, may be fused, adhered, welded, brazed and/or otherwise bonded to the top skin 32 and/or the bottom skin 34. The cellular core 36 may also or alternatively be mechanically fastened to the top skin 32 and/or the bottom skin 34. Alternatively, the cellular core 36 may be formed integral with the top skin 32 and/or the bottom skin 34 as a monolithic body using, for example, additive manufacturing. However, the present disclosure is not limited to any particular manufacturing methods.

The top skin 32 may be configured as a relatively thin layer of material that extends longitudinally and laterally along the X-Y plane. This layer of top skin material may be a solid, continuous and/or uninterrupted (e.g., non-porous, non-perforated) sheet of material; however, the present disclosure is not limited thereto as described below in further detail. This top skin material may include, but is not limited to, a polymer, a fiber reinforced composite (e.g., fiberglass composite, carbon fiber composite, aramid fiber composite, composite reinforced by any combination of glass, carbon, aramid or other fibers, etc.), pure metal, metal alloy, metal matrix composite, ceramic, or ceramic matrix composite, or a combination thereof. In case of polymers or fiber reinforced polymer-matrix composites, thermoset or thermoplastic polymers can be used among others. The top skin 32 has a vertical thickness 38 that extends vertically between opposing interior and exterior side surfaces 40 and 42 of the top skin 32. The thickness 38 of the top skin 32 may be uniform or non-uniform along the X-Y plane.

The bottom skin 34 may be configured as a relatively thin layer of material that extends longitudinally and laterally along the X-Y plane. This layer of bottom skin material may be a solid, continuous and/or uninterrupted (e.g., non-porous, non-perforated) sheet of material. This bottom skin material may include, but is not limited to, a polymer, a fiber reinforced composite (e.g., fiberglass composite, carbon fiber composite, aramid fiber composite, composite reinforced by any combination of glass, carbon, aramid or other fibers, etc.), pure metal, metal alloy, metal matrix composite, ceramic, or ceramic matrix composite, or a combination thereof. In case of polymers or fiber reinforced polymer-matrix composites, thermoset or thermoplastic polymers can be used among others. The bottom skin material may be the same as or different than the top skin material. The bottom skin 34 has a vertical thickness 44 that extends vertically between opposing exterior and interior side surfaces 46 and 48 of the bottom skin 34. This vertical thickness 44 may be substantially equal to or different (e.g., greater or less) than the vertical thickness 38 of the top skin 32. The thickness 44 the bottom skin 34 may be uniform or non-uniform along the X-Y plane.

The cellular core 36 extends longitudinally and laterally along the X-Y plane. The cellular core 36 has a vertical thickness 50 that extends vertically between opposing sides 52 and 54 of the core 36, which core sides 54 and 52 are respectively abutted against the top skin 32 and the bottom skin 34 and their interior side surfaces 40 and 48, respectfully. The vertical thickness 50 may be substantially greater than the vertical thicknesses 38, 44 of the top skin 32 and/or the bottom skin 34, respectively. The vertical thickness 50, for example, may be at least ten to forty times (10-40×), or more, greater than the vertical thicknesses 38 and 44; however, the structured panels 30 of the present disclosure are not limited to such an exemplary embodiment.

Figure 2:
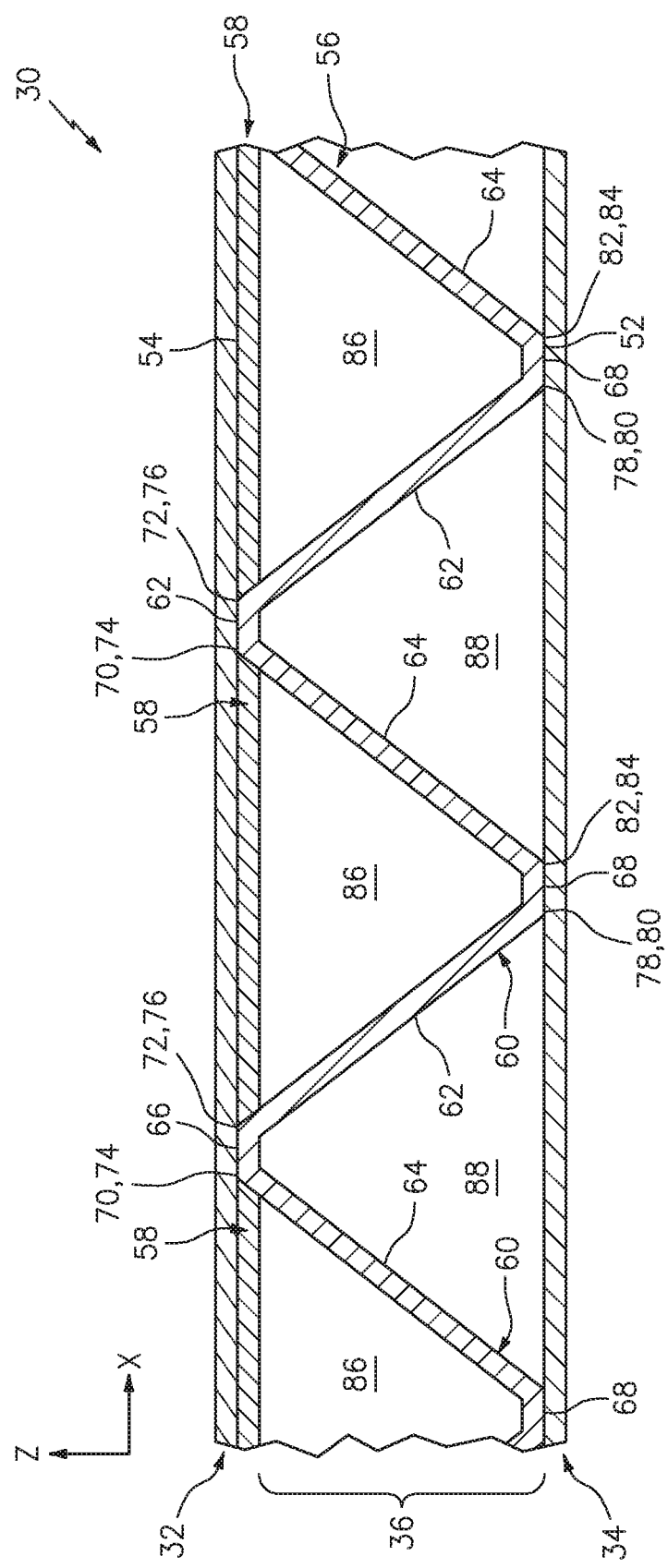
FIG. 2 is a cross-sectional illustration of a portion of the structured panel taken along line 2-2 in FIG. 4.
Figure 3:
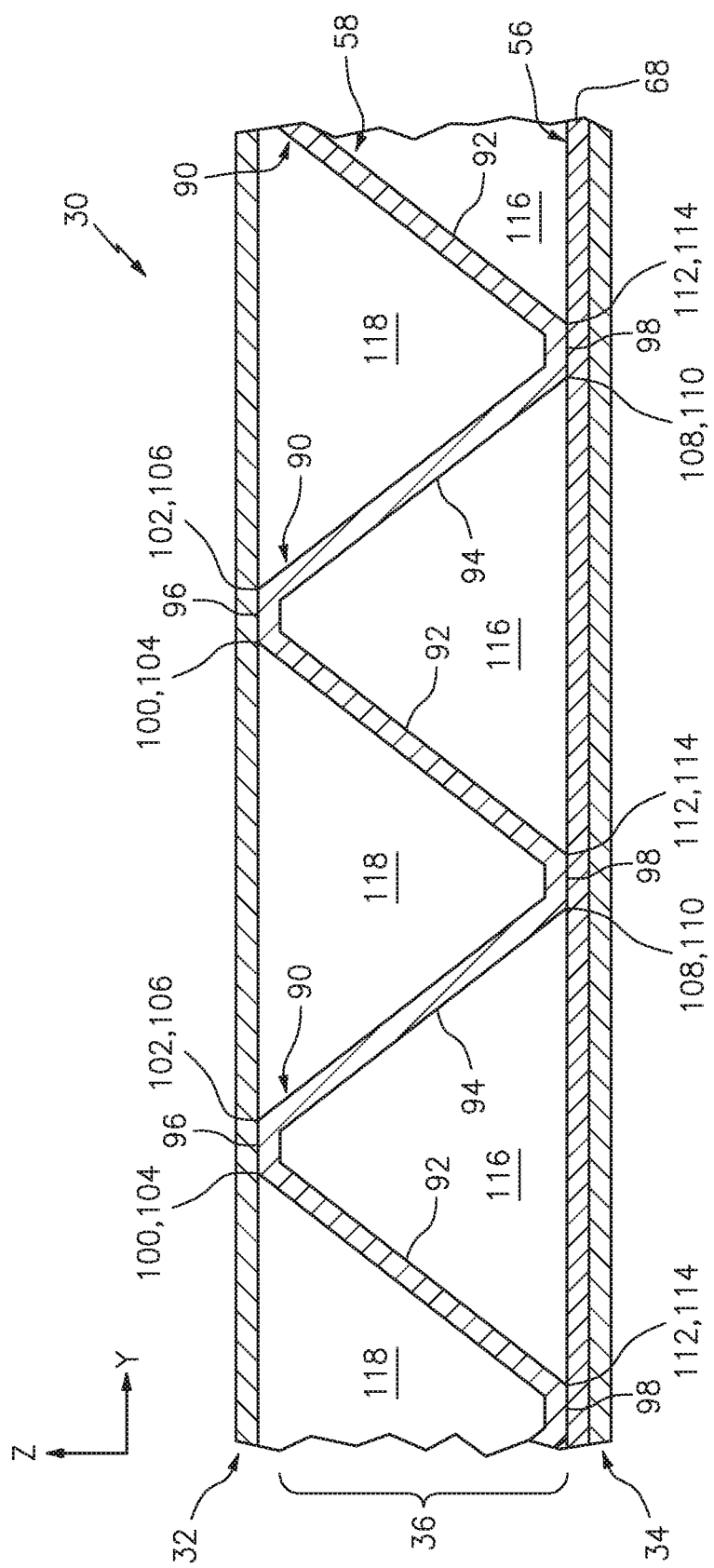
FIG. 3 is a cross-sectional illustration of a portion of the structured panel taken along line 3-3 in FIG. 4.
Figure 4:
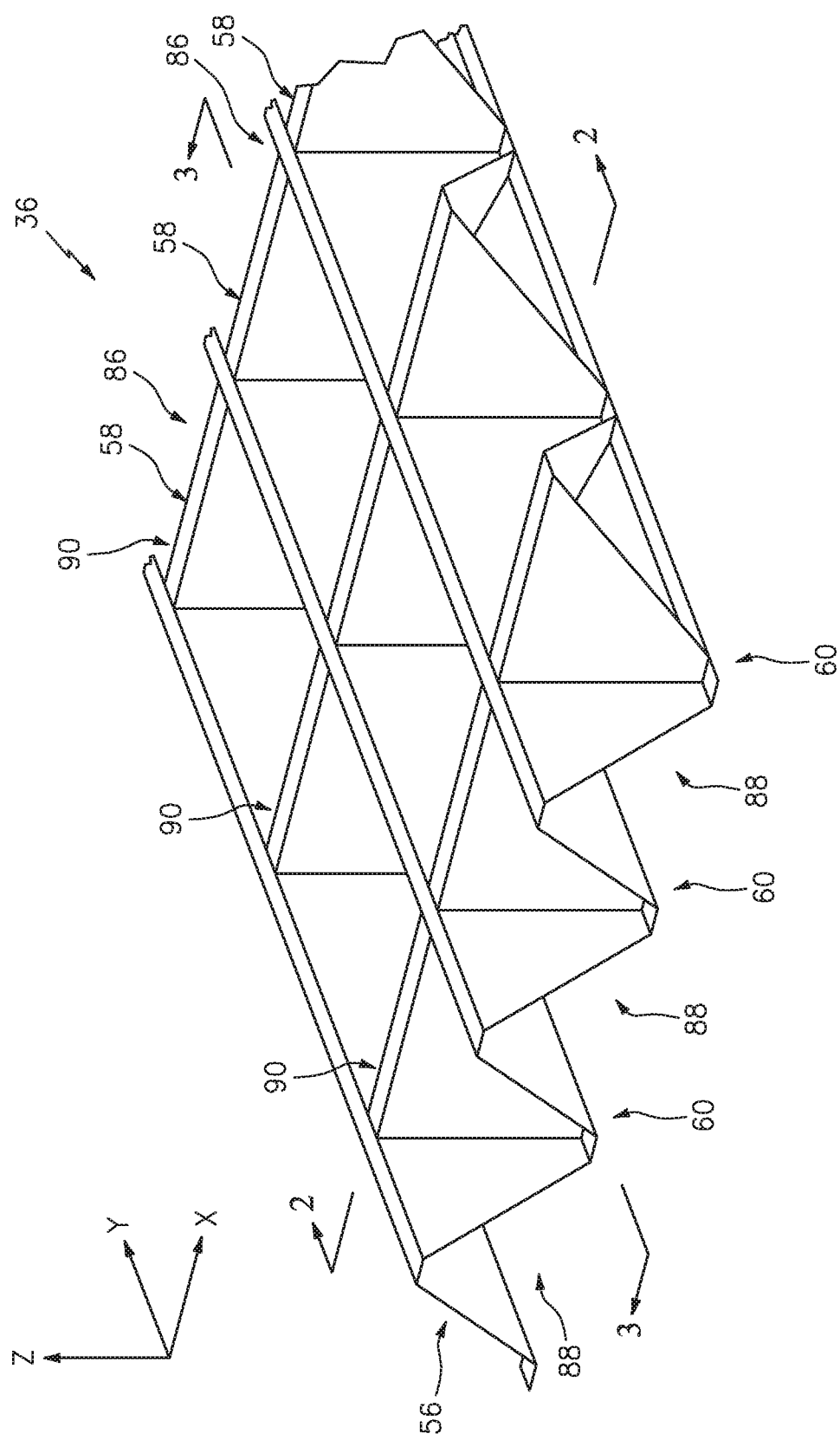
FIG. 4 is a perspective illustration of a portion of a cellular core.
Figure 5:
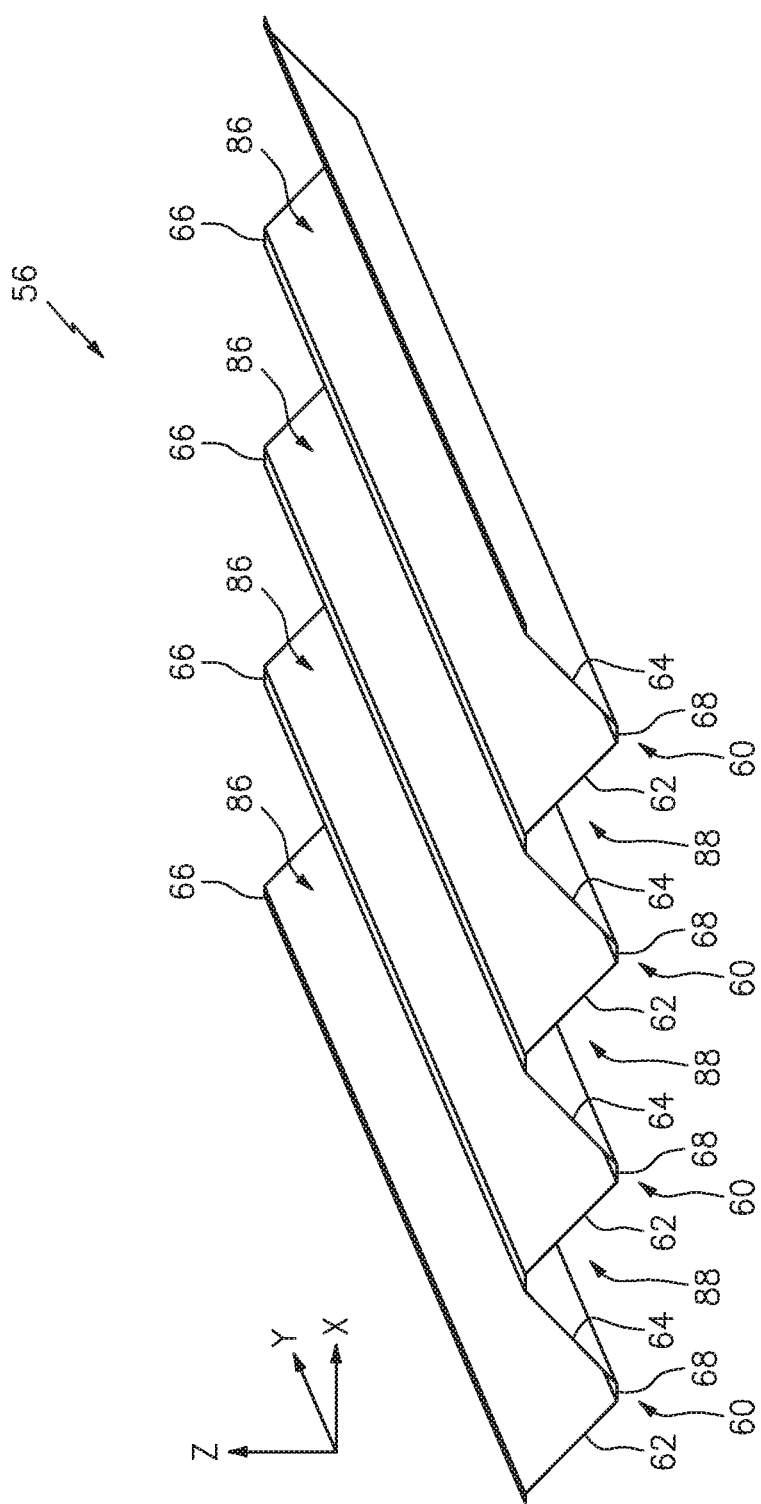
FIG. 5 is a perspective illustration of a portion of a cellular core and, specifically, a corrugated base.

Referring to FIGS. 2-4, the cellular core 36 includes a corrugated base 56 (e.g., a corrugated sheet of material) and one or more corrugated stringers 58 (e.g., corrugated ribbons of material). Referring to FIG. 5, the corrugated base 56 includes a plurality of base corrugations 60.

Figure 6:
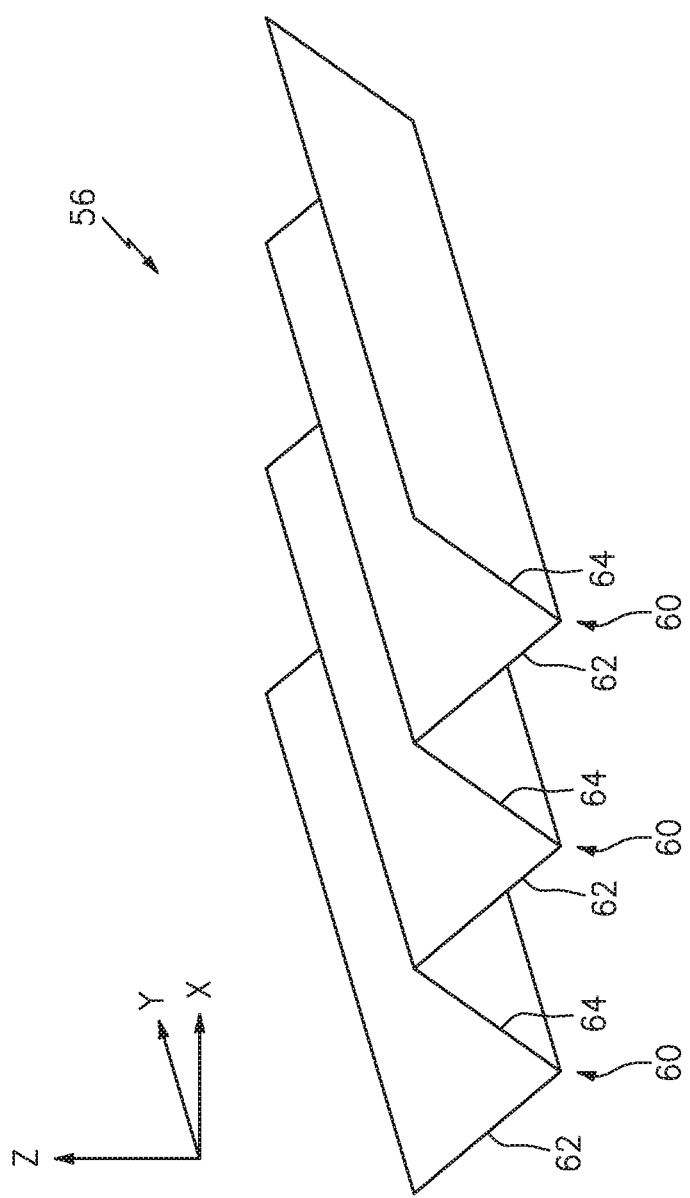
FIG. 6 is a perspective illustration of a portion of a cellular core and, specifically, an alternative corrugated base.

The base corrugations 60 are arranged in a laterally extending array. This arrangement provides the corrugated base 56 with an accordion wall structure. More particularly, the base corrugations 60 are configured from at least a plurality of first base segments 62 and a plurality of second base segments 64. The base corrugations 60 of FIG. 5 are also configured from a plurality of top bridge segments 66 (e.g., top peak extensions) and/or a plurality of bottom bridge segments 68 (e.g., bottom peak extensions). However, in other embodiments, the top and/or the bottom bridge segments 66, 68 may be omitted as illustrated, for example, in FIG. 6.

Each of the first base segments 62 may be configured as a solid, continuous and/or uninterrupted (e.g., non-porous, non-perforated) panel of base material. Each of the second base segments 64 may be configured as a solid, continuous and/or uninterrupted (e.g., non-porous, non-perforated) panel of base material. Each of the top bridge segments 66 may be configured as a solid, continuous and/or uninterrupted (e.g., non-porous, non-perforated) panel of base material. Each of the bottom bridge segments 68 may be configured as a solid, continuous and/or uninterrupted (e.g., non-porous, non-perforated) panel of base material. However, one or more of the foregoing base corrugation elements 62, 64, 66 and/or 68 may alternatively be configured as a perforated and/or otherwise porous panel of material in alternative embodiments.

The base material may include, but is not limited to, a polymer, a fiber reinforced composite (e.g., fiberglass composite, carbon fiber composite, aramid fiber composite, composite reinforced by any combination of glass, carbon, aramid or other fibers, etc.), pure metal, metal alloy, metal matrix composite, ceramic, or ceramic matrix composite, or a combination thereof. In case of polymers or fiber reinforced polymer-matrix composites, thermoset or thermoplastic polymers can be used among others. The base material may be the same as or different than the top skin material and/or the bottom skin material.

Each base corrugation 60 includes a respective one of the first base segments 62, a respective one of the second base segments 64, a respective one of the top bridge segments 66 and a respective one of the bottom bridge segments 68. Each of these corrugation elements 62, 64, 66 and/or 68 extends longitudinally along a longitudinal length of the respective base corrugation 60 as shown in FIG. 5.

Referring to FIG. 2, the top bridge segment 66 extends laterally from a distal first end 70 to a second end 72. The top bridge segment 66 may also be attached (e.g., adhered and/or otherwise bonded to) to the top skin 32. The first end 70 may be connected to a top end 74 of a second base segment 64 in a laterally adjacent one of the base corrugations 60, which top end 74 may be attached (e.g., adhered and/or otherwise bonded to) to the top skin 32. The second end 72 is connected to a top end 76 of the first base segment 62, which top end 76 may be attached (e.g., adhered and/or otherwise bonded to) to the top skin 32. The first base segment 62 extends laterally and/or vertically (e.g., diagonally) from its top end 76 to a bottom end 78, which is connected to a first end 80 of the bottom bridge segment 68. The bottom end 78 may be attached (e.g., adhered and/or otherwise bonded to) to the bottom skin 34. The bottom bridge segment 68 extends laterally from its first end 80 to a second end 82, which is connected to a bottom end 84 of the second base segment 64. The bottom end 84 may be attached (e.g., adhered and/or otherwise bonded to) to the bottom skin 34. The bottom bridge segment 68 may also be attached (e.g., adhered and/or otherwise bonded to) to the bottom skin 34. The second base segment 64 extends laterally and/or vertically (e.g., diagonally) from its bottom end 84 to its top end 74, which may be connected the first end 70 of the top bridge segment 66 in a laterally adjacent one of the base corrugations 60. With the foregoing configuration, the first base segments 62 are non-parallel with the second base segments 64. In particular, each first base segment 62 is angularly offset from a laterally adjacent second base segment 64 by an angle, which may be an acute angle, a ninety degree angle or an obtuse angle. Each first base segment 62 and/or each second base segment 64 may also be angularly offset from the top skin 32 and/or the bottom skin 34 by an acute angle.

Referring to FIG. 5, each base corrugation 60 forms a top channel 86 within the corrugated base 56. This top channel 86 extends laterally between the first base segment 62 and the second base segment 64. The top channel 86 extends vertically into the corrugated base 56 from the core side 54 to the bottom bridge segment 68 (see FIG. 2). The top channel 86 also extends longitudinally along the entire longitudinal length of the base corrugation 60.

Each laterally adjacent pair of the base corrugations 60 of FIG. 2 also forms a bottom channel 88 within the corrugated base 56. The bottom channel 88 extends laterally between the second base segment 64 of a first of the adjacent base corrugations 60 to the first base segment 62 of a second of the adjacent base corrugations 60. The bottom channel 88 extends vertically into the corrugated base 56 from the core side 52 to the top bridge segment 66 of the second of the adjacent base corrugations 60 (see FIG. 2). The bottom channel 88 also extends longitudinally along the entire longitudinal lengths of the adjacent base corrugations 60. The top channels 86 and the bottom channels 88 are positioned on top and bottom opposing sides of the corrugated base 56 such that the top channels 86 are vertically adjacent and enclosed by the top skin 32 and the bottom channels 88 are vertically adjacent and enclosed by the bottom skin 34 as shown in FIG. 2.

Figure 7:
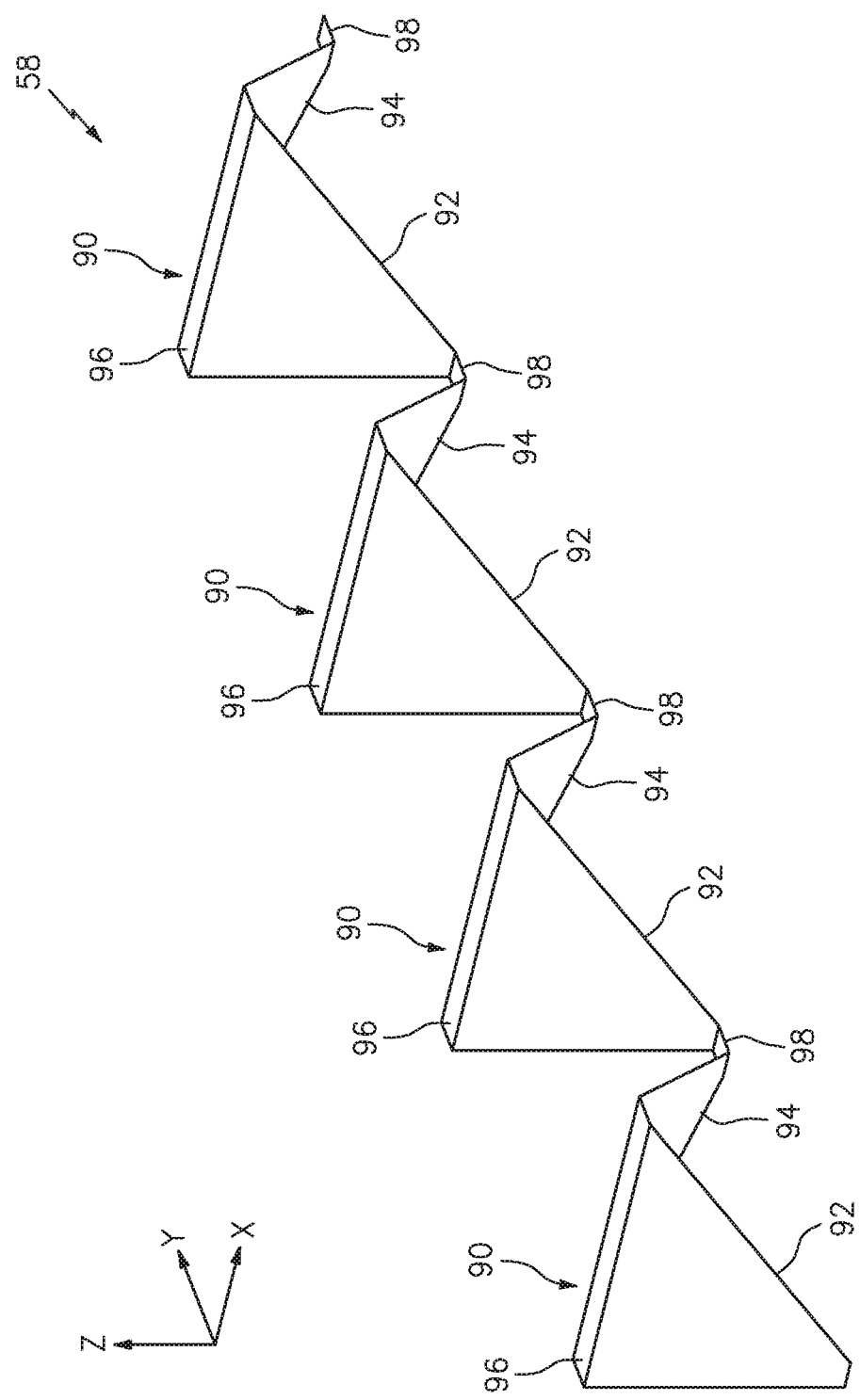
FIG. 7 is a perspective illustration of a portion of a cellular core and, specifically, a corrugated stringer.
Figure 8:
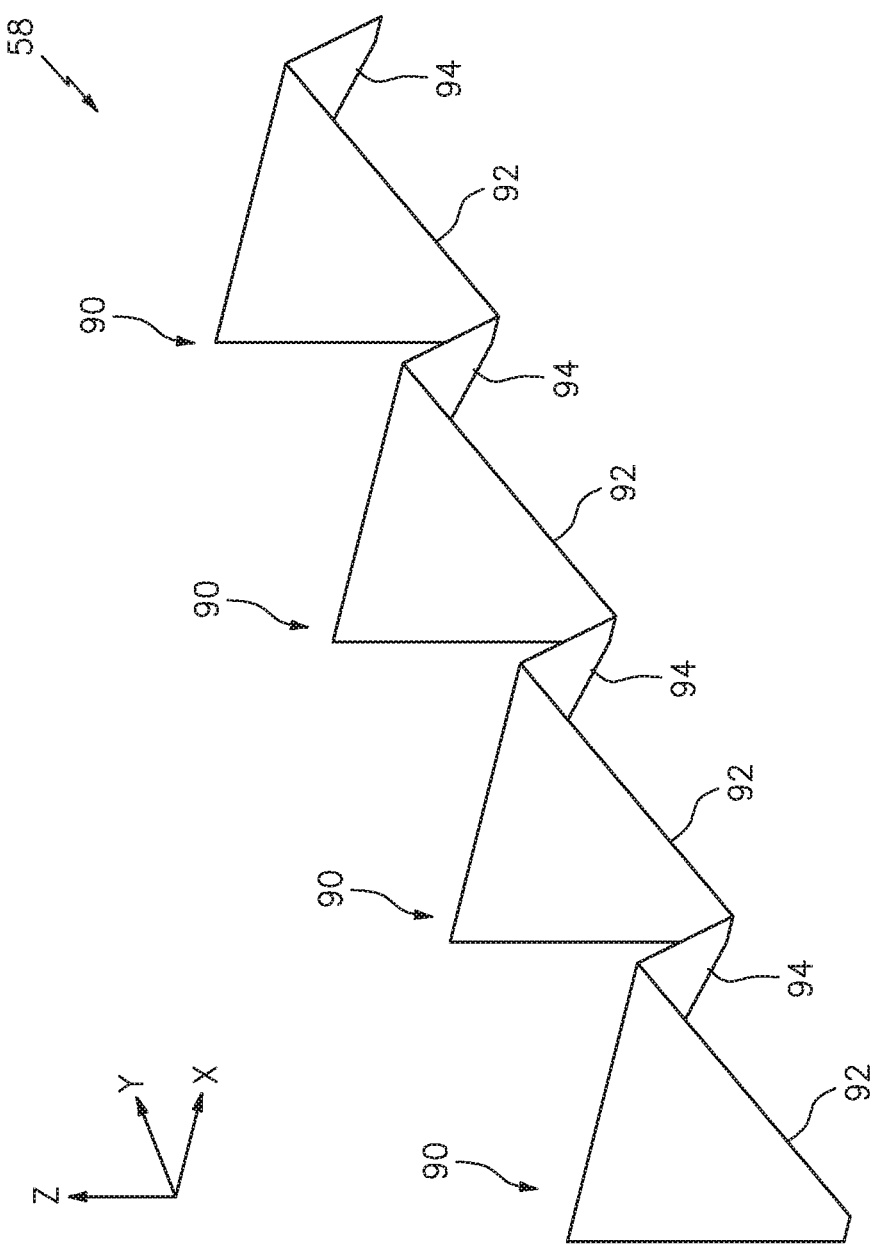
FIG. 8 is a perspective illustration of a portion of a cellular core and, specifically, an alternative corrugated stringer.

Referring to FIG. 7, each corrugated stringer 58 includes a plurality of stringer corrugations 90. The stringer corrugations 90 are arranged in a longitudinally extending array. This arrangement provides each corrugated stringer 58 with an accordion ribbon structure. More particularly, the stringer corrugations 90 of a respective corrugated stringer 58 are configured from at least a plurality of first stringer segments 92 and a plurality of second stringer segments 94. The stringer corrugations 90 of FIG. 7 are also configured from a plurality of exterior bridge segments 96 (e.g., top peak extensions) and/or a plurality of interior bridge segments 98 (e.g., bottom peak extensions). However, in other embodiments, the exterior and/or the interior bridge segments 98 may be omitted as illustrated, for example, in FIG. 8.

Each of the first stringer segments 92 may be configured as a solid, continuous and/or uninterrupted (e.g., non-porous, non-perforated) panel of stringer material. Each of the second stringer segments 94 may be configured as a solid, continuous and/or uninterrupted (e.g., non-porous, non-perforated) panel of stringer material. Each of the exterior bridge segments 96 may be configured as a solid, continuous and/or uninterrupted (e.g., non-porous, non-perforated) panel of stringer material. Each of the interior bridge segments 98 may be configured as a solid, continuous and/or uninterrupted (e.g., non-porous, non-perforated) panel of stringer material. However, one or more of the foregoing base stringer elements 92, 94, 96 and/or 98 may alternatively be configured as a perforated and/or otherwise porous panel of material in alternative embodiments.

The stringer material may include, but is not limited to, a polymer, a fiber reinforced composite (e.g., fiberglass composite, carbon fiber composite, aramid fiber composite, composite reinforced by any combination of glass, carbon, aramid or other fibers, etc.), pure metal, metal alloy, metal matrix composite, ceramic, or ceramic matrix composite, or a combination thereof. In case of polymers or fiber reinforced polymer-matrix composites, thermoset or thermoplastic polymers can be used among others. The stringer material may be the same as or different than the base material, the top skin material and/or the bottom skin material.

Each stringer corrugation 90 includes a respective one of the first stringer segments 92, a respective one of the second stringer segments 94, a respective one of the exterior bridge segments 96 and a respective one of the interior bridge segments 98. Each of these corrugation elements 92, 94, 96 and/or 98 extends laterally along a lateral length of the respective base corrugation 60 as shown in FIG. 7.

Referring to FIG. 4, the stringer corrugations 90 of each of the corrugated stringers 58 are arranged longitudinally along and within a respective one of the top channels 86; however, in alternative embodiments, stringer corrugations 90 may also or alternatively be arranged within a respective bottom channel 88 as described below. Each of the stringer corrugations 90 of FIG. 4 and, in general, the respective corrugated stringer 58 is connected to the corrugated base 56 and the top skin 32 (see FIG. 3; or the bottom skin 34 when in the bottom channel 88).

Referring to FIG. 3, the interior bridge segment 98 extends longitudinally from a first end 110 to a second end 112, which second end 112 is connected to a bottom end 114 of the first stringer segment 92. The bottom end 114 may be attached (e.g., adhered and/or otherwise bonded to) to the corrugated base 56 and a respective one of the bottom bridge segments 68. The interior bridge segment 98 may also be attached (e.g., adhered and/or otherwise bonded to) to the corrugated base 56 and a respective one of the bottom bridge segments 68. The first stringer segment 92 extends longitudinally and/or vertically (e.g., diagonally) from its bottom end 114 to a top end 104, which top end 104 may be connected to a first end 100 of the exterior bridge segment 96. The top end 104 may be attached (e.g., adhered and/or otherwise bonded to) to the top skin 32. The exterior bridge segment 96 extends longitudinally from its first end 100 to a second end 102. The exterior bridge segment 96 may also be attached (e.g., adhered and/or otherwise bonded to) to the top skin 32. The second end 102 is connected to a top end 106 of the second stringer segment 94, which top end 106 may be attached (e.g., adhered and/or otherwise bonded to) to the top skin 32. The second stringer segment 94 extends longitudinally and/or vertically (e.g., diagonally) from its top end 106 to a bottom end 108, which is connected to the first end 110 of the interior bridge segment 98. The bottom end 108 may be attached (e.g., adhered and/or otherwise bonded to) to the corrugated base 56 and a respective one of the bottom bridge segments 68. With the foregoing configuration, the first base segments 62 are non-parallel with the second base segments 64. In particular, each first stringer segment 92 is angularly offset from a longitudinally adjacent second stringer segment 94 by an angle, which may be an acute angle, a ninety degree angle or an obtuse angle. Each first stringer segment 92 and/or each second stringer segment 94 may also be angularly offset from the top skin 32 and/or the bottom skin 34 by an acute angle.

Each stringer corrugation 90 forms an interior (e.g., bottom) cavity 116 within the corrugated stringer 58. This interior cavity 116 extends longitudinally between the first stringer segment 92 and the second stringer segment 94. The interior cavity 116 extends vertically between the corrugated stringer 58 and its elements 92, 94 and 96 and the corrugated base 56 and its elements 62, 64 and 68; see also FIG. 2. The interior cavity 116 also extends laterally between the first base segment 62 and the second base segment 64 of a respective base corrugation 60; see FIG. 2.

Referring to FIG. 3, each longitudinally adjacent pair of the stringer corrugations 90 also forms an exterior (e.g., top) cavity 118 within the corrugated stringer 58. The exterior cavity 118 extends longitudinally between the second stringer segment 94 of a first of the adjacent stringer corrugations 90 to the first stringer segment 92 of a second of the adjacent stringer corrugations 90. The exterior cavity 118 extends vertically between the corrugated stringer 58 and its elements 92, 94 and 98 and the top skin 32. Referring to FIG. 2, the exterior cavity 118 also extends laterally between the first base segment 62 and the second base segment 64 of a respective base corrugation 60. Each corrugated stringer 58 thereby may (e.g., partially or completely fluidly) divide/separate a respective top channel 86 (or alternatively bottom channel 88) into the interdisposed, alternating interior and exterior cavities 116 and 118.

Figure 9:
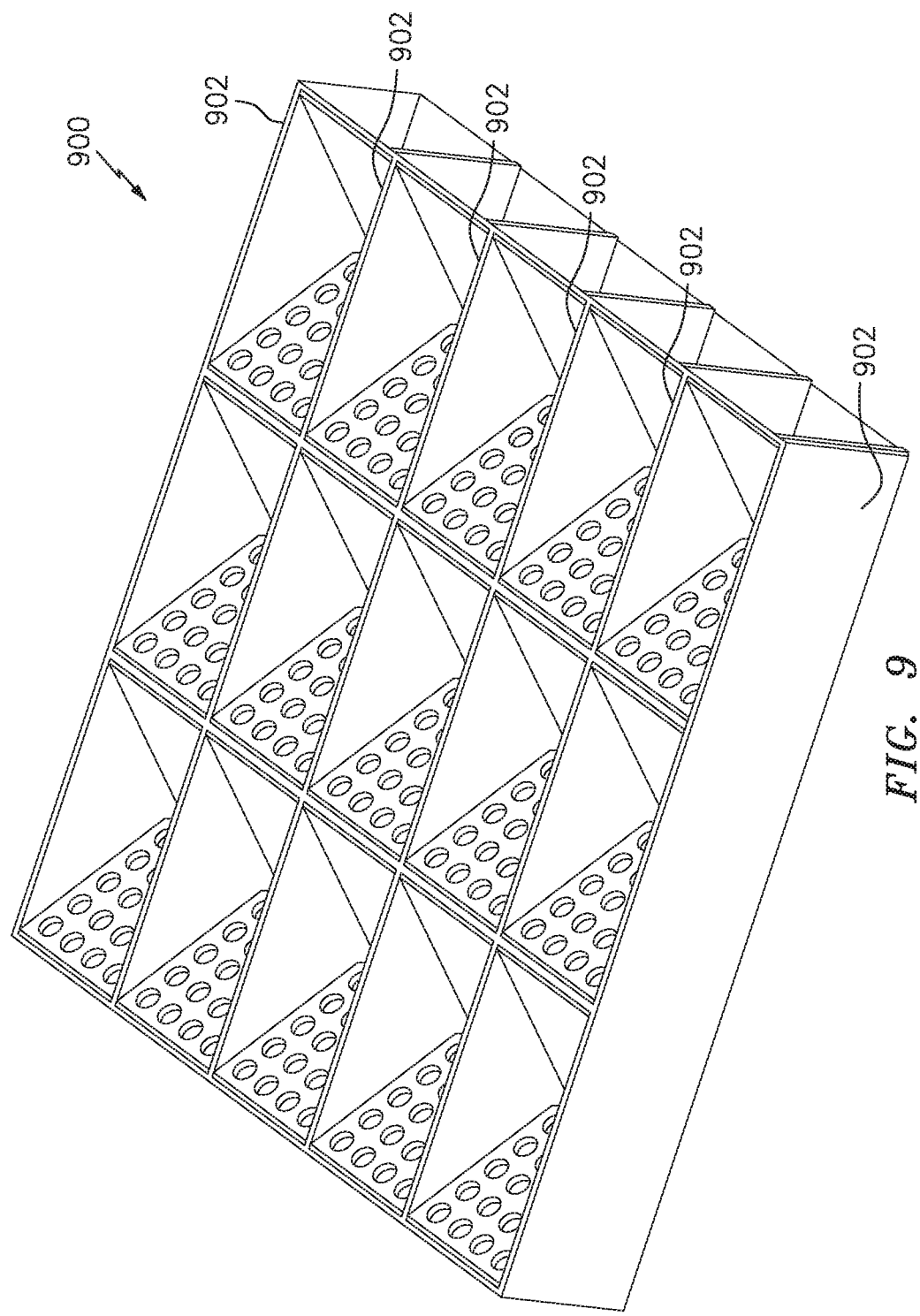
FIG. 9 is a perspective illustration of a portion of a cellular core of a prior art acoustic panel.

The above-described core 36 configuration may increase a vertical stiffness of the cellular core 36 as compared to a core 900 with vertically straight sidewalls 902 as illustrated in FIG. 9. More particularly, the above-described core 36 configuration provides the core 36 with a trussed architecture in both a lateral-vertical plane and a longitudinal-vertical plane.

Figure 10:
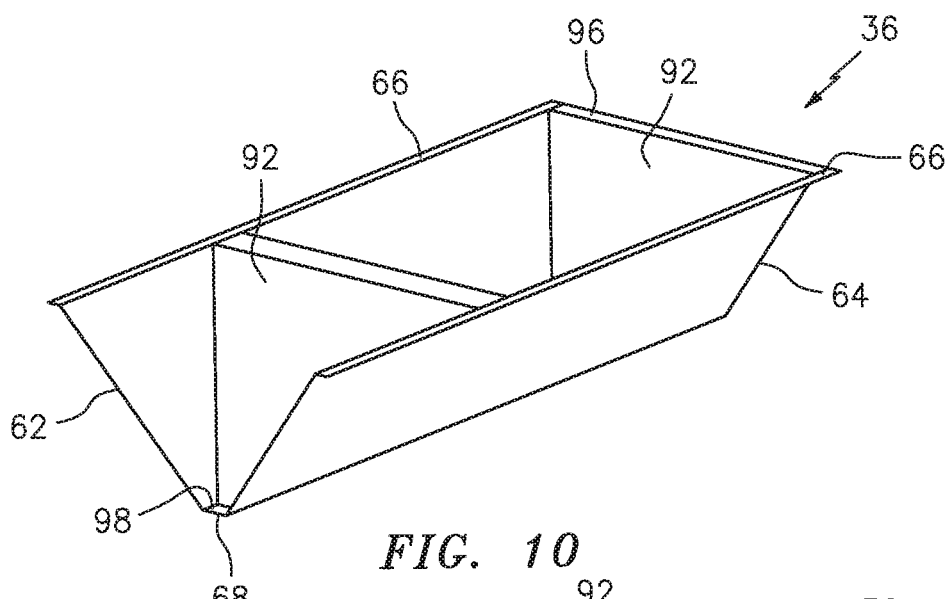
FIG. 10 is a perspective illustration of a periodic portion of the cellular core of FIG. 4.
Figure 11:
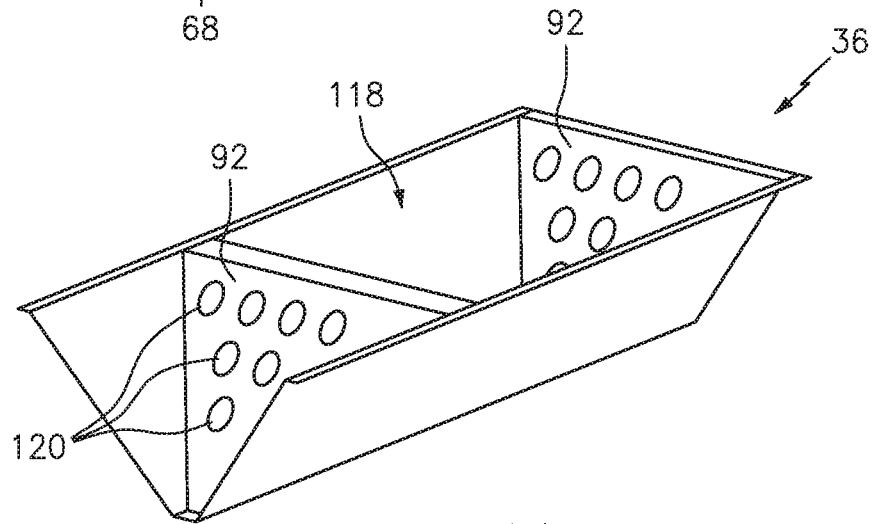
FIGS. 11-19 are perspective illustrations of periodic portions of alternative cellular cores.
Figure 12:
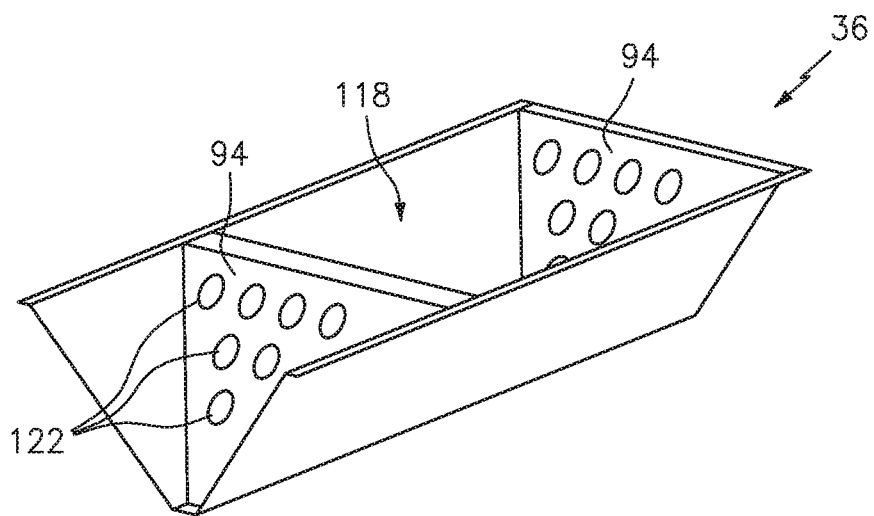
Figure 13:
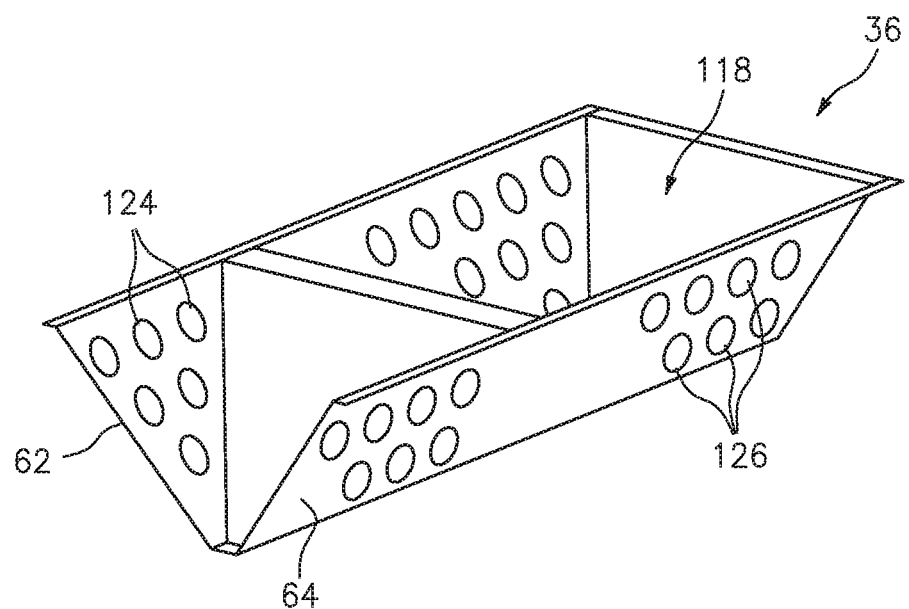
Figure 14:
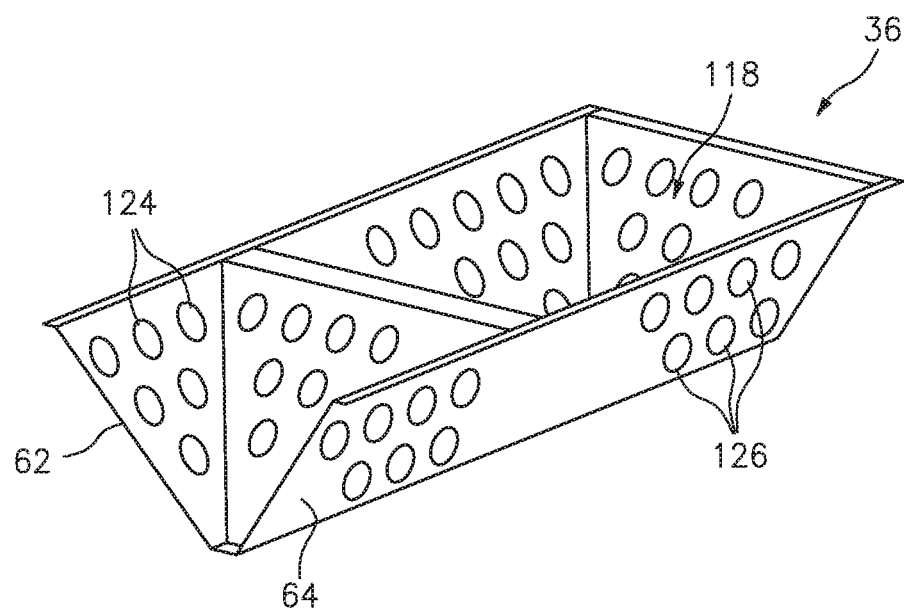

Referring to FIGS. 2, 3 and 10, each of the base elements 62, 64, 66 and 68 and each of the stringer elements 92, 94, 96 and 98 is described above as being configured from a solid, continuous and/or uninterrupted (e.g., non-porous, non-perforated) piece of material. In such embodiments, each of these core elements 62, 64, 92 and 94 is configured as a baffle. The core elements 66, 68, 96 and 98 function as reinforcements for the top and the bottom skins 32 and 34. However, in other embodiments, one or more of the core elements 62, 64, 92 and 94 may alternatively be configured as a perforated and/or otherwise porous septum; e.g., include one or more perforations (e.g., through-holes). One or more of the core elements 62, 64, 92 and 94, for example, may be configured from a perforated and/or otherwise porous piece of material; e.g., see FIGS. 11-14. For example, referring to FIG. 11, one or more or each of the first stringer segments 92 may each be configured with one or more perforations 120 (e.g., through-holes), which fluidly couple longitudinally adjacent interior and exterior cavities 116 and 118 (interior cavities 116 not visible in FIG. 11) on opposing sides of a respective segment 92. Referring to FIG. 12, one or more or each of the second stringer segments 94 may each be configured with one or more perforations 122 (e.g., through-holes), which fluidly couple longitudinally adjacent interior and exterior cavities 116 and 118 (interior cavities 116 not visible in FIG. 12) on opposing sides of a respective segment 94. Referring to FIGS. 13 and 14, one or more or each of the first base segments 62 may each be configured with one or more perforations 124 (e.g., through-holes), which fluidly couple laterally adjacent interior and/or exterior cavities 116 and 118 (interior cavities 116 not visible in FIGS. 13 and 14) on opposing sides of a respective segment 62. One or more or each of the second base segments 64 may each be configured with one or more perforations 126 (e.g., through-holes), which fluidly couple laterally adjacent interior and/or exterior cavities 116 and 118 on opposing sides of a respective segment 64.

Figure 15:
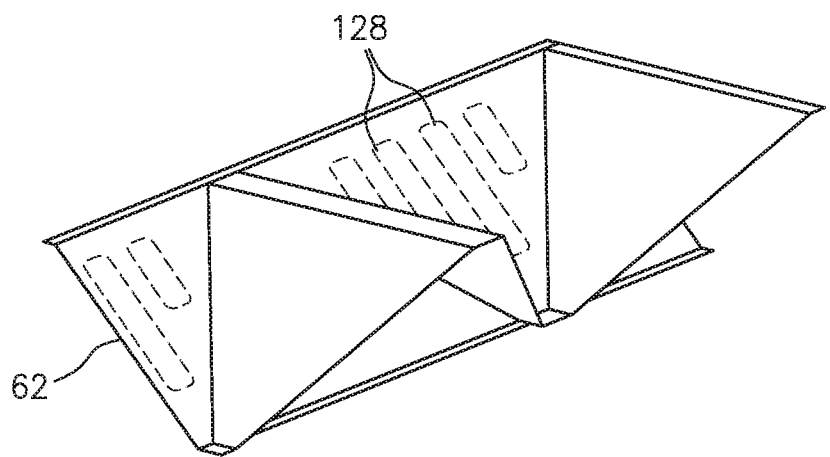
Figure 16:
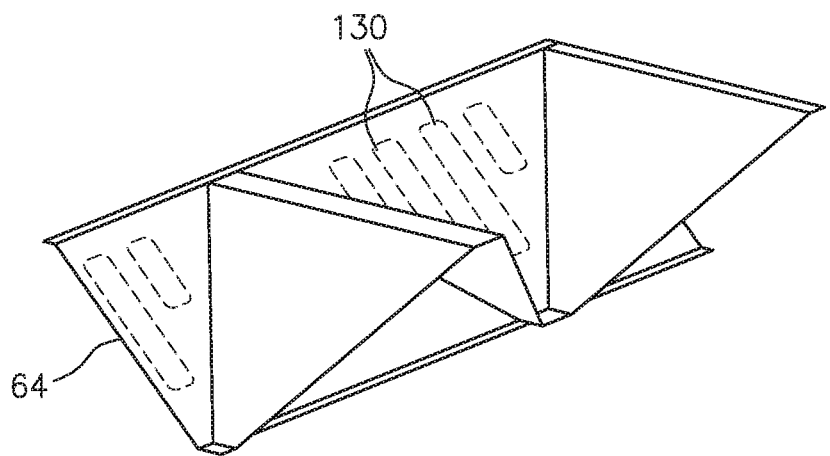
Figure 17:
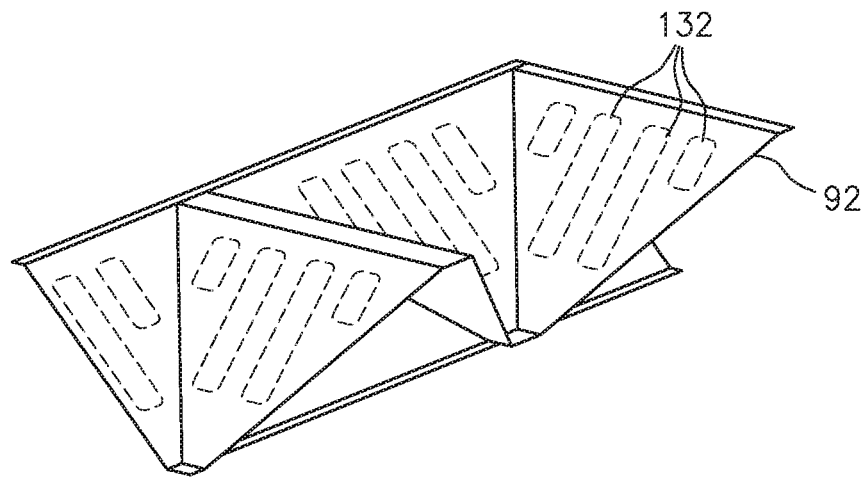
Figure 18:
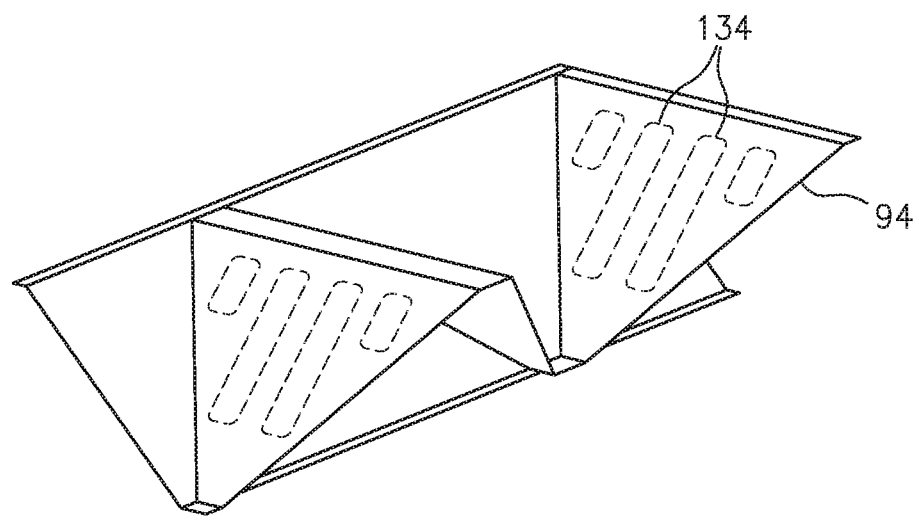
Figure 19:
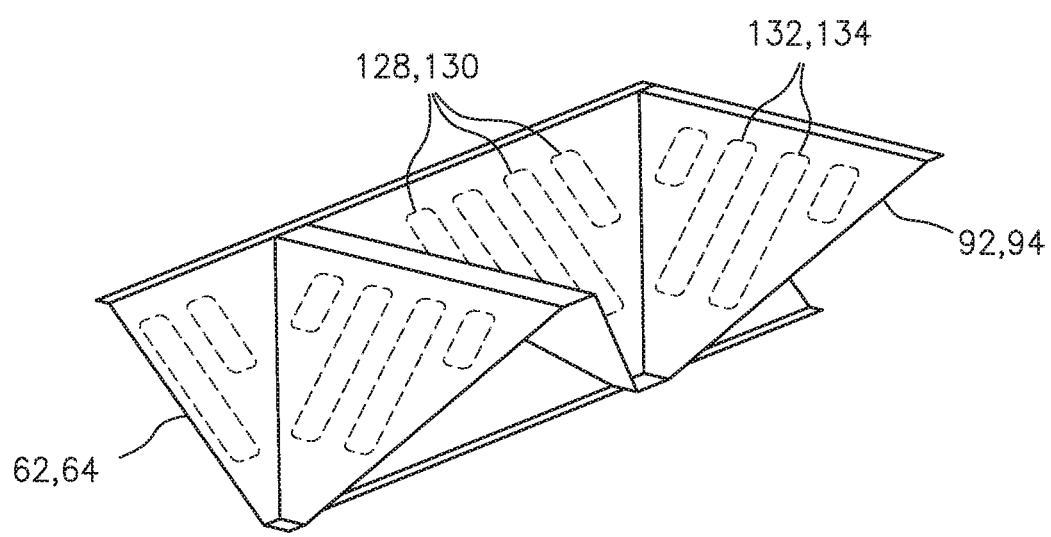

Referring to FIGS. 2, 3 and 10, each of the base elements 62, 64, 66 and 68 and each of the stringer elements 92, 94, 96 and 98 is described above as being configured from a flat (e.g., planar) piece of material. However, in other embodiments, one or more of the core elements 62, 64, 92 and 94 may alternatively be configured with one or more structural reinforcements; e.g., see FIGS. 15-19. One or more of the core elements 62, 64, 92 and 94, for example, may each be configured with one or more interconnected and/or discrete ribs. For example, referring to FIG. 15, one or more or each of the first base segments 62 may each be configured with one or more ribs 128. Referring to FIG. 16, one or more or each of the second base segments 64 may each be configured with one or more ribs 130. Referring to FIG. 17, one or more or each of the first stringer segments 92 may each be configured with one or more ribs 132. Referring to FIG. 18, one or more or each of the second stringer segments 94 may each be configured with one or more ribs 134. Referring to FIG. 19, one or more or each of the second stringer segments 92 and 94 may each be configured with one or more ribs 134 and 134.

Figure 20:
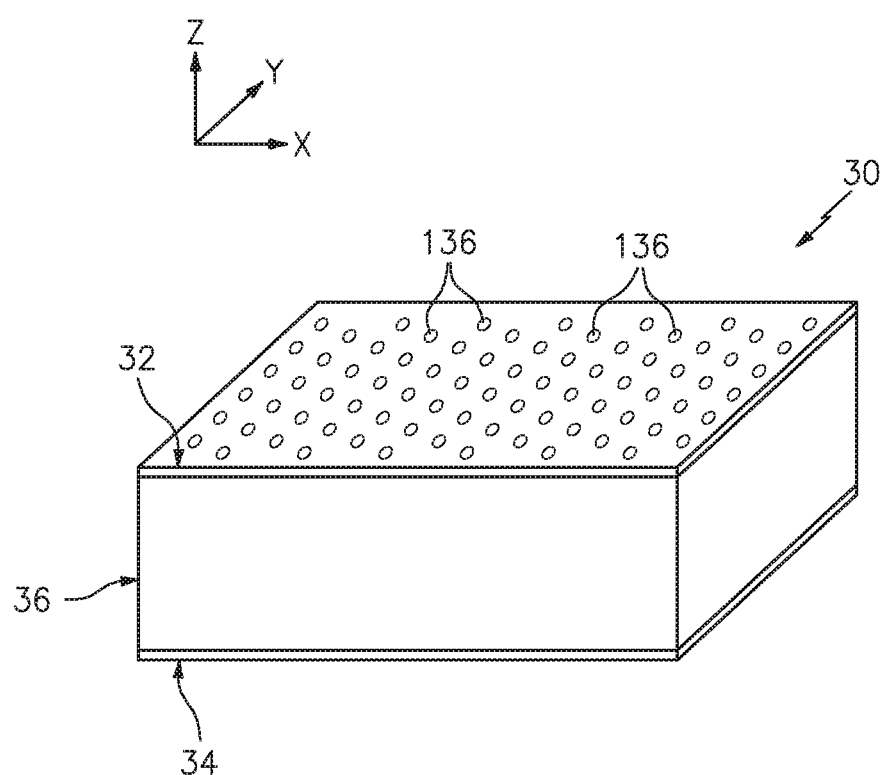
FIG. 20 is a partial, perspective block diagram illustration of an alternative structured panel.

The top skin 32 is described above as being configured from a solid, continuous and/or uninterrupted (e.g., non-porous, non-perforated) piece of material. However, in other embodiments, the top skin 32 may alternatively be configured as a perforated and/or otherwise porous top skin 32. The top skin 32, for example, may be configured from a perforated and/or otherwise porous piece of material with one or more perforations 136 (e.g., through-holes) as shown, for example, in FIG. 20.

Figure 21:
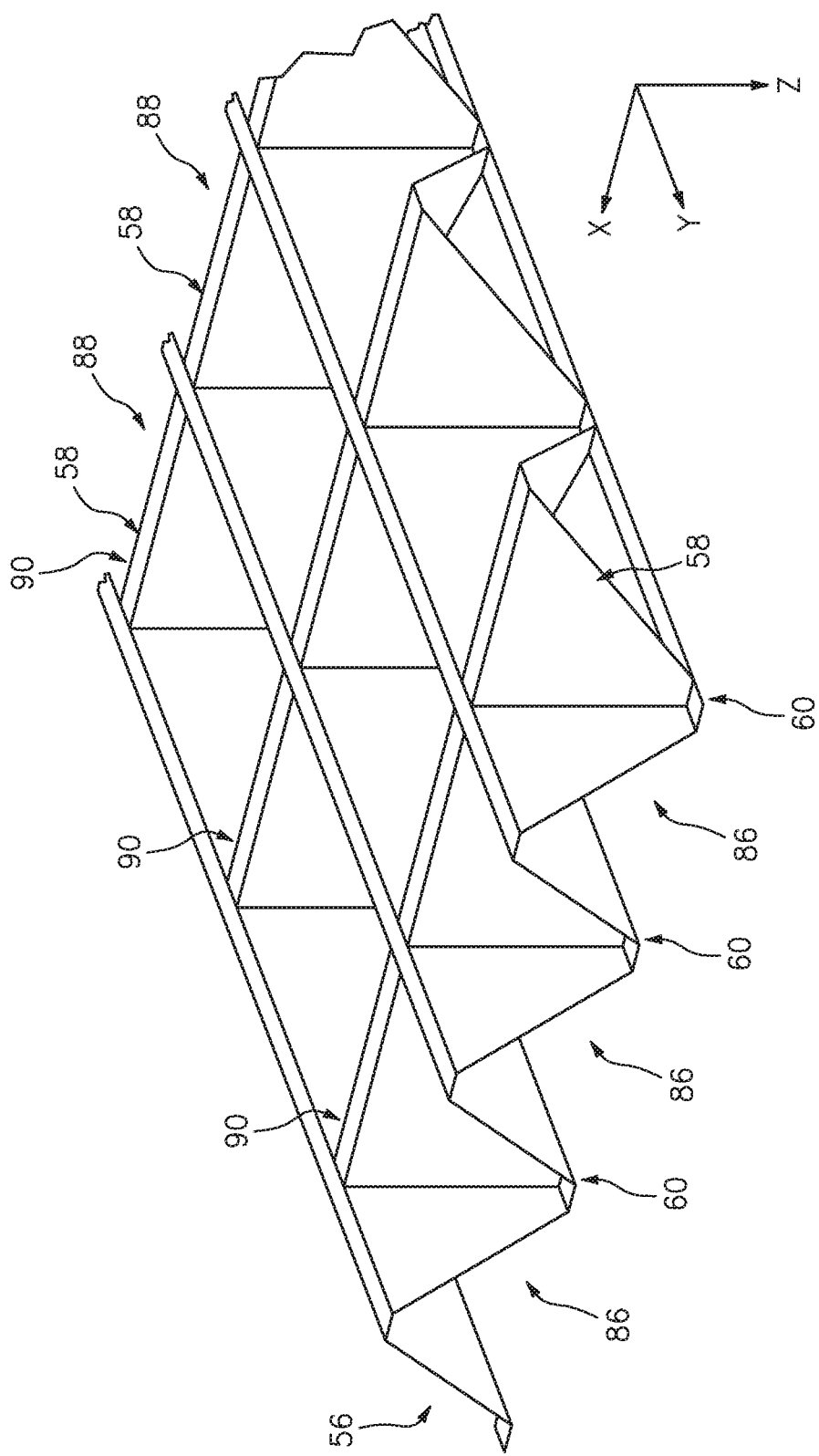
FIG. 21 is a perspective illustration of a portion of an alternative cellular core.

The corrugated stringers 58 are described above as being within the top channels 86. However, in other embodiments, one or more corrugated stringers 58 may also or alternatively be arranged within one or more or each of the bottom channels 88 as shown, for example, in FIG. 21.

The panel 30 is described above as including both the top skin 32 and the bottom skin 34. However, in other embodiments, the panel 30 may be configured without the top skin 32 or the bottom skin 34. In still other embodiments, the panel 30 may be configured without both the top skin 32 and the bottom skin 34 such that opposing sides of the core 36 define peripheral side boundaries of the panel.

Figure 22:
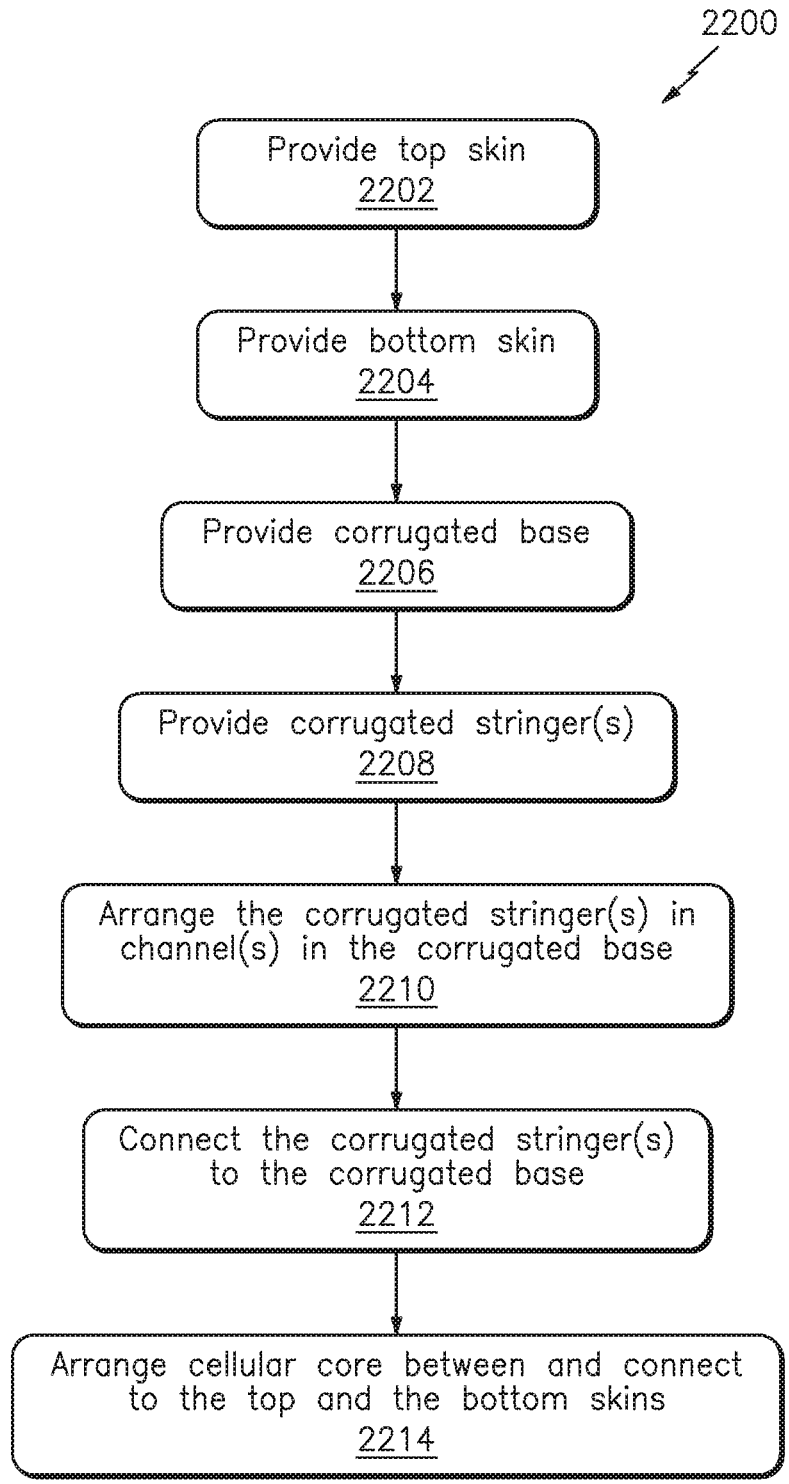
FIG. 22 is a flow diagram of a method for forming a structured panel.

FIG. 22 is a flow diagram of a method 2200 for forming a structured panel such as, but not limited to, the structural panels 30 of FIGS. 1-21. In step 2202, the top skin 32 is provided; e.g., received or formed. Where the top skin 32 is a porous (e.g., perforated) top skin 32, the skin 32 may be perforated when received and/or formed. Alternatively, the top skin 32 may be perforated (e.g., laser ablation, drilling, etc.) after one or more of the following method 2200 steps.

In step 2204, the bottom skin 34 is provided; e.g., received or formed.

Figure 23:
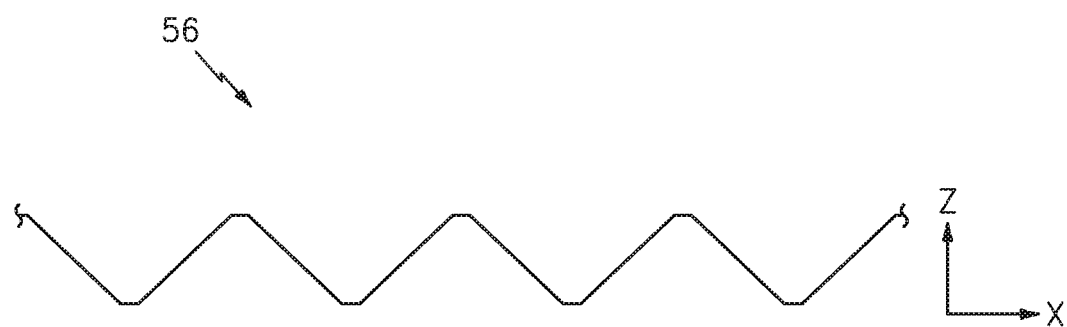
FIG. 23 is a cross-sectional illustration of a portion of the corrugated base of FIG. 5.
Figure 24:
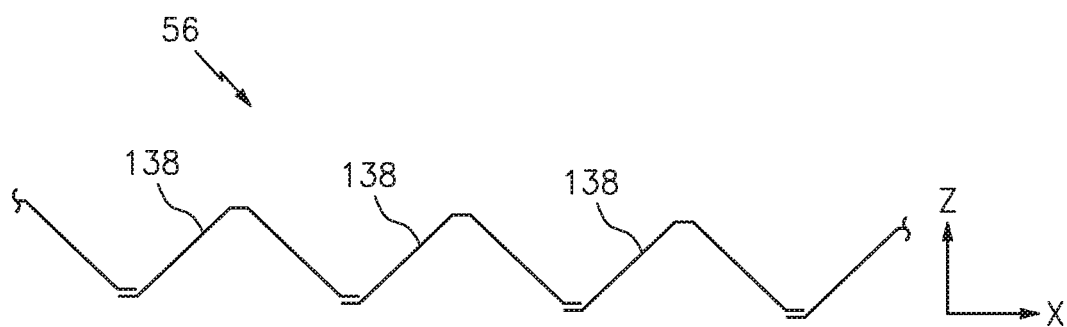
FIG. 24 is a cross-sectional illustration of a portion of an alternative corrugated base.
Figure 27A:
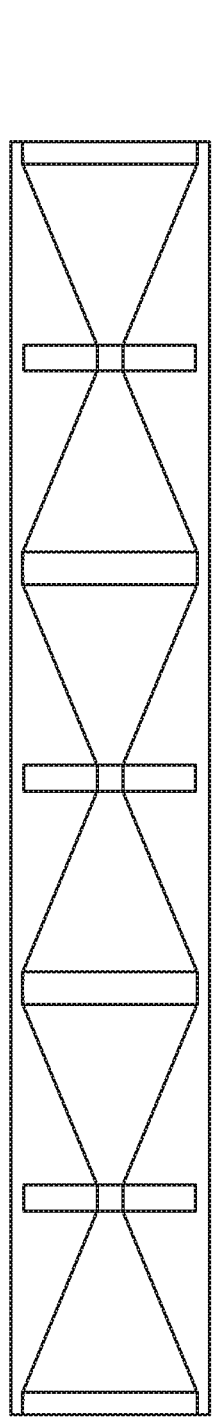
FIGS. 27A-27C illustrate a sequence of steps for forming an alternative corrugated stringer.
Figure 27B:
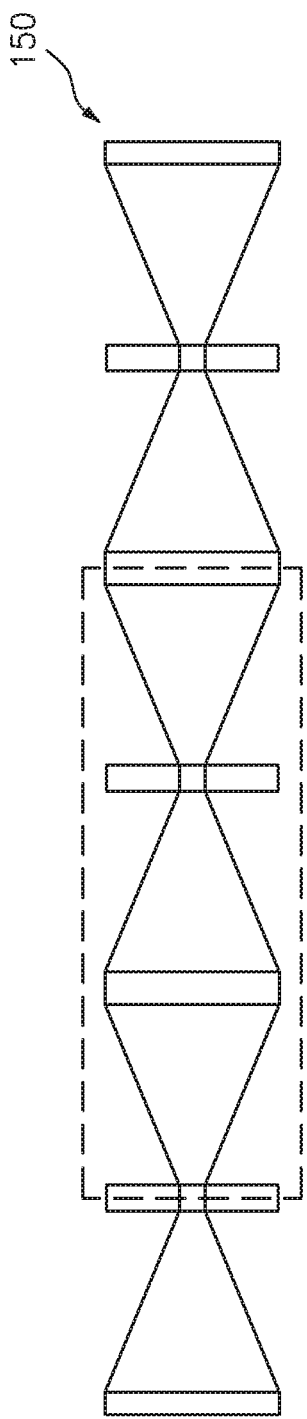
Figure 27C:
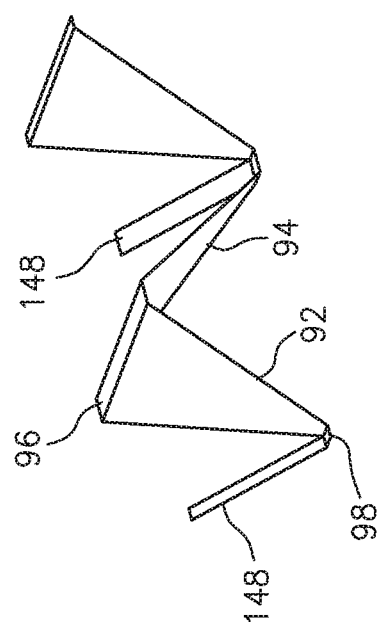

In step 2206, the corrugated base 56 is provided. For example, a flat sheet of material may be corrugated (e.g., folded, bent or otherwise formed) to provide the corrugated base 56 as shown, for example, in FIG. 5. This corrugated base 56 may be formed as a single monolithic body as shown, for example, in FIG. 23. Alternatively, the corrugated base 56 may be formed from a plurality of discrete bodies 138 (e.g., individual corrugations or groups of corrugations) that are respectively connected (e.g., bonded) together in an end-to-end arrangement as shown, for example, in FIG. 24. Various different techniques may be utilized to form the corrugated base 56. Examples of such techniques are disclosed in U.S. Pat. No. 9,403,340 and U.S. patent application Ser. Nos. 15/943,963; 16/220,513 and 16/382,450, each of which is assigned to the assignee of the present disclosure and hereby incorporated herein by reference in its entirety. Where one or more portion of the corrugated base 56 are porous (e.g., perforated), the material of the base 56 may be perforated prior to, during and/or subsequent to the corrugating.

In step 2208, one or more of the corrugated stringers 58 is provided. A strip of material 139, for example, may be cut as shown in FIGS. 25A-C. The original flat strip 139 (FIG. 25A) is then marked according to a flat definition of the stringer (FIG. 25B), and finally cut (FIG. 25C) to create a stringer perform 140 for follow-up corrugation. This stringer preform 140 may then be corrugated (e.g., folded, bent or otherwise formed) to provide the corrugated stringer 58 shown, for example, in FIG. 25D. In another example, a strip of material 142 may be cut as shown in FIGS. 26A-C. The original flat strip 142 (FIG. 26A) is then marked according to a flat definition of the stringer (FIG. 26B), and finally cut (FIG. 26C) to create a stringer perform 144 for follow-up corrugation. This stringer preform 144 may then be corrugated (e.g., folded, bent or otherwise formed) to provide the corrugated stringer 58 shown, for example, in FIG. 26D. In this embodiment, the corrugated stringer 58 includes one or more tabs 146 and 148. These tabs 146 and 18 provide additional bonding surface area as described below. Of course, various other stringer preform 150 and 152 configurations may alternatively be used, non-limiting examples of which as shown in FIGS. 27A-C and 28A-C. Where one or more portion of the corrugated stringer(s) 58 are porous (e.g., perforated), the material of the stringer(s) 58 may be perforated prior to, during and/or subsequent to the corrugating.

In step 2210, each corrugated stringer 58 is arranged in a respective one of the channels 86, 88. In particular, the stringer corrugations 90 of a respective corrugated stringer 58 are located longitudinally along and vertically within a respective top channel 86 (or bottom channel 88).

In step 2212, each of the corrugated stringers 58 is connected to the corrugated base 56 to provide the cellular core 36. Each corrugated stringer 58, for example, may be welded, brazed, adhered and/or otherwise bonded to a respective one of the base corrugations 60 where the stringer 58 is within a respective top channel 86. Where the stringer 58 is within a respective bottom channel 88, the corrugated stringer 58 may be bonded to a respective laterally adjacent pair of the base corrugations 60.

Each corrugated stringer 58 may be bonded to the corrugated base 56 via one or more of the tabs 146 and/or 148; e.g., see FIG. 26D. These tabs 146 and/or 148 may be arranged flat against a respective element (e.g., 62, 64) of the corrugated base 56 and, thereby, increase the surface area for bonding between the corrugated stringer 58 and the corrugated base 56.

In step 2214, the cellular base is arranged vertically between and connected to the top skin 32 and the bottom skin 34 to provide the structured panel 30; e.g., a noise attenuating panel.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A panel, comprising:
a core including a corrugated base and a corrugated stringer;
the corrugated base including a plurality of base corrugations configured from at least a plurality of first base segments, a plurality of second base segments and a plurality of base bridge segments, a first of the plurality of base corrugations including a first of the plurality of first base segments, a first of the plurality of second base segments and a first of the plurality of base bridge segments, the first of the plurality of second base segments non-parallel to the first of the plurality of first base segments, the first of the plurality of base bridge segments extending laterally between and connected to the first of the plurality of first base segments and the first of the plurality of second base segments, and the first of the plurality of base corrugations forming a first channel that extends laterally between and longitudinally along the first of the plurality of first base segments and the first of the plurality of second base segments; and
the corrugated stringer including a plurality of stringer corrugations arranged longitudinally along and within the first channel, the plurality of stringer corrugations configured from at least a plurality of first stringer segments, a plurality of second stringer segments and a plurality of stringer bridge segments, a first of the plurality of stringer corrugations including a first of the plurality of first stringer segments, a first of the plurality of second stringer segments and a first of the plurality of stringer bridge segments, the first of the plurality of second stringer segments non-parallel to the first of the plurality of first stringer segments, the first of the plurality of stringer bridge segments extending longitudinally between and connected to the first of the plurality of first stringer segments and the first of the plurality of second stringer segments, and the first of the plurality of stringer bridge segments attached to the first of the plurality of base bridge segments.

2. The panel of claim 1, wherein
the first of the plurality of first base segments is angularly offset from the first of the plurality of second base segments by a base segment angle, and the base segment angle is one of an acute angle, a ninety-degree angle and an obtuse angle; and
the first of the plurality of first stringer segments is angularly offset from the first of the plurality of second stringer segments by a stringer segment angle, and the stringer segment angle is one of an acute angle, a ninety-degree angle and an obtuse angle.

3. The panel of claim 1, wherein
the core is configured with a cavity;
the cavity extends laterally between the first of the plurality of first base segments and the first of the plurality of second base segments; and
the cavity extends longitudinally between the first of the plurality of first stringer segments and the first of the plurality of second stringer segments.

4. The panel of claim 1, wherein each of the plurality of stringer corrugations extends laterally between and is connected to the first of the plurality of first base segments and the first of the plurality of second base segments.

5. The panel of claim 1, further comprising:
a first skin;
the core arranged adjacent and connected to the first skin.

6. The panel of claim 5, wherein the first skin is a porous first skin.

7. The panel of claim 1, further comprising:
a first skin; and
a second skin;
the core arranged between the first skin and the second skin;

each of the plurality of base corrugations connected to the first skin and the second skin, wherein the first of the plurality of base bridge segments is between and attached to the second skin and the first of the plurality of stringer bridge segments; and each of the plurality of stringer corrugations connected to at least the first skin or the second skin.

8. The panel of claim 1, wherein
the first of the plurality of first base segments is configured as a first baffle; and
the first of the plurality of second base segments is configured as a second baffle.

9. The panel of claim 1, wherein
the first of the plurality of first base segments is configured as a baffle; and
the first of the plurality of second base segments is configured as a porous septum.

10. The panel of claim 1, wherein
the first of the plurality of first base segments is configured as a first porous septum; and
the first of the plurality of second base segments is configured as a second porous septum.

11. The panel of claim 1, wherein
the first of the plurality of first stringer segments is configured as a first baffle; and
the first of the plurality of second stringer segments is configured as a second baffle.

12. The panel of claim 1, wherein
the first of the plurality of first stringer segments is configured as a baffle; and
the first of the plurality of second stringer segments is configured as a porous septum.

13. The panel of claim 1, wherein
the first of the plurality of first stringer segments is configured as a first porous septum; and
the first of the plurality of second stringer segments is configured as a second porous septum.

14. The panel of claim 1, wherein at least one of the first of the plurality of first base segments and the first of the plurality of second base segments is each configured with a structural reinforcement.

15. The panel of claim 1, wherein at least one of the first of the plurality of first stringer segments and the first of the plurality of second stringer segments is each configured with a structural reinforcement.

16. The panel of claim 1, wherein
a second of the plurality of base corrugations includes a second of the plurality of first base segments and a second of the plurality of second base segments that is non-parallel to the second of the plurality of first base segments, and the second of the plurality of base corrugations forms a second channel that extends laterally between and longitudinally along the second of the plurality of first base segments and the second of the plurality of second base segments;
the core further includes a second corrugated stringer; and
the second corrugated stringer includes a plurality of second stringer corrugations arranged longitudinally along and within the second channel.

17. The panel of claim 1, wherein
a second of the plurality of base corrugations includes a second of the plurality of first base segments and a second of the plurality of second base segments that is non-parallel to the second of the plurality of first base segments, and a second channel extends laterally between and longitudinally along the first of the plurality of second base segments and the second of the plurality of first base segments;
the core further includes a second corrugated stringer; and
the second corrugated stringer includes a plurality of second stringer corrugations arranged longitudinally along and within the second channel.

18. A panel, comprising:
a first skin;
a second skin; and
a core arranged vertically between and connected to the first skin and the second skin, the core including a corrugated base and a plurality of corrugated stringers;
the corrugated base configured with a plurality of base corrugations, a plurality of first channels and a plurality of second channels, each of the plurality of base corrugations forming a respective one of the first channels adjacent the first skin, and each adjacent pair of the plurality of base corrugations forming a respective one of the second channels laterally therebetween and adjacent the second skin; and
each of the plurality of corrugated stringers configured with a plurality of stringer corrugations arranged within a respective one of the first channels and connected to the corrugated base and the first skin;
wherein a first of the plurality of base corrugations includes a base corrugation portion at a peak of the first of the plurality of base corrugations; and
wherein the base corrugation portion is disposed vertically between and is attached to the second skin and each of the plurality of stringer corrugations of a first of the plurality of corrugated stringers.

19. The panel of claim 18, wherein
each of the plurality of stringer corrugations of the first of the plurality of corrugated stringers includes a stringer corrugation portion at a peak of the respective stringer corrugation; and
the stringer corrugation portion of each of the plurality of stringer corrugations of the first of the plurality of corrugated stringers is attached to the base corrugation portion.

20. The panel of claim 19, wherein
a first of the plurality of stringer corrugations of the first of the plurality of corrugated stringers further includes a first stringer segment and a second stringer segment that is angularly offset from the first stringer segment; and
the stringer corrugation portion of the first of the plurality of stringer corrugations extends longitudinally between and is connected to the first stringer segment and the second stringer segment.

* * * * *